(12) United States Patent
Yarkoni et al.

(10) Patent No.: US 12,530,613 B2
(45) Date of Patent: Jan. 20, 2026

(54) SYSTEMS AND METHODS FOR PERFORMING QUANTUM EVOLUTION IN QUANTUM COMPUTATION

(71) Applicant: D-WAVE SYSTEMS INC., Burnaby (CA)

(72) Inventors: Sheir Yarkoni, Vancouver (CA); Trevor Michael Lanting, Vancouver (CA); Kelly T. R. Boothby, Vancouver (CA); Andrew Douglas King, Vancouver (CA); Evgeny A. Andriyash, Vancouver (CA); Mohammad H. Amin, Coquitlam (CA)

(73) Assignee: D-WAVE SYSTEMS INC., Burnaby (CA)

( * ) Notice: Subject to any disclaimer, the term of this patent is extended or adjusted under 35 U.S.C. 154(b) by 148 days.

(21) Appl. No.: 18/514,482

(22) Filed: Nov. 20, 2023

(65) Prior Publication Data

US 2024/0256930 A1 Aug. 1, 2024

Related U.S. Application Data

(63) Continuation of application No. 16/858,108, filed on Apr. 24, 2020, now Pat. No. 11,861,455, which is a (Continued)

(51) Int. Cl.
*G06N 10/60* (2022.01)
*B82Y 10/00* (2011.01)
(Continued)

(52) U.S. Cl.
CPC .............. *G06N 10/60* (2022.01); *B82Y 10/00* (2013.01); *G06N 3/044* (2023.01); *G06N 3/047* (2023.01); *G06N 7/08* (2013.01)

(58) Field of Classification Search
CPC ........ G06N 10/60; G06N 10/70; G06N 20/00; G06N 10/00; G06N 10/80
See application file for complete search history.

(56) References Cited

U.S. PATENT DOCUMENTS 7,135,701 B2 11/2006 Amin et al.
7,253,654 B2 8/2007 Amin
(Continued)

FOREIGN PATENT DOCUMENTS

CN 103249368 B 1/2016
CN 112771549 A 5/2021
(Continued)

OTHER PUBLICATIONS

King et al., "Algorithm Engineering for a Quantum Annealing Platform," arXiv (2014) (Year: 2014).*
(Continued)

*Primary Examiner* — Brian M Smith
*Assistant Examiner* — Kevin L. Smith
(74) *Attorney, Agent, or Firm* — Cozen O'Connor

(57) ABSTRACT

A computational method via a hybrid processor comprising an analog processor and a digital processor includes determining a first classical spin configuration via the digital processor, determining preparatory biases toward the first classical spin configuration, programming an Ising problem and the preparatory biases in the analog processor via the digital processor, evolving the analog processor in a first direction, latching the state of the analog processor for a first dwell time, programming the analog processor to remove the preparatory biases via the digital processor, determining a tunneling energy via the digital processor, determining a second dwell time via the digital processor, evolving the analog processor in a second direction until the analog processor reaches the tunneling energy, and evolving the
(Continued)

analog processor in the first direction until the analog processor reaches a second classical spin configuration.

19 Claims, 13 Drawing Sheets

Related U.S. Application Data continuation of application No. 16/308,314, filed as application No. PCT/US2017/036387 on Jun. 7, 2017, now Pat. No. 10,671,937.

(60) Provisional application No. 62/417,940, filed on Nov. 4, 2016, provisional application No. 62/364,169, filed on Jul. 19, 2016, provisional application No. 62/347,421, filed on Jun. 8, 2016.

(51) Int. Cl.
*G06N 3/044* (2023.01)
*G06N 3/047* (2023.01)
*G06N 7/08* (2006.01)

(56) References Cited

U.S. PATENT DOCUMENTS

| | | | |
|---|---|---|---|
| 7,307,275 B2 | 12/2007 | Lidar et al. |
| 7,418,283 B2 | 8/2008 | Amin |
| 7,533,068 B2 | 5/2009 | Maassen et al. |
| 7,624,088 B2 | 11/2009 | Johnson et al. |
| 7,876,248 B2 | 1/2011 | Berkley et al. |
| 8,008,942 B2 | 8/2011 | Van et al. |
| 8,169,231 B2 | 5/2012 | Berkley |
| 8,175,995 B2 | 5/2012 | Amin |
| 8,190,548 B2 | 5/2012 | Choi |
| 8,195,596 B2 | 6/2012 | Rose et al. |
| 8,244,650 B2 | 8/2012 | Rose |
| 8,421,053 B2 | 4/2013 | Bunyk et al. |
| 8,494,993 B2 | 7/2013 | Harris et al. |
| 8,504,497 B2 | 8/2013 | Amin |
| 8,560,282 B2 | 10/2013 | Love et al. |
| 8,854,074 B2 | 10/2014 | Berkley |
| 9,015,215 B2 | 4/2015 | Berkley et al. |
| 9,129,224 B2 | 9/2015 | Lanting et al. |
| 9,471,880 B2 | 10/2016 | Williams |
| 9,495,644 B2 | 11/2016 | Chudak et al. |
| 9,727,824 B2 | 8/2017 | Rose et al. |
| 9,881,256 B2 | 1/2018 | Hamze et al. |
| 10,002,107 B2 | 6/2018 | Lanting |
| 10,339,466 B1 | 7/2019 | Ding et al. |
| 10,552,755 B2 | 2/2020 | Lanting et al. |
| 11,100,418 B2 | 8/2021 | Bunyk et al. |
| 11,263,547 B2 | 3/2022 | Reinhardt et al. |
| 2002/0184166 A1 | 12/2002 | Jackson et al. |
| 2004/0000666 A1 | 1/2004 | Lidar et al. |
| 2006/0225165 A1 | 10/2006 | Maassen et al. |
| 2008/0109500 A1 | 5/2008 | Macready et al. |
| 2008/0176750 A1 | 7/2008 | Rose et al. |
| 2008/0260257 A1 | 10/2008 | Rose |
| 2009/0121215 A1 | 5/2009 | Choi |
| 2009/0167342 A1 | 7/2009 | Van et al. |
| 2009/0299947 A1* | 12/2009 | Amin ............ B82Y 10/00 706/13 |
| 2010/0022820 A1 | 1/2010 | Leuthardt et al. |
| 2010/0185572 A1 | 7/2010 | Bonabeau et al. |
| 2010/0228694 A1 | 9/2010 | Le et al. |
| 2011/0031994 A1 | 2/2011 | Berkley |
| 2011/0060710 A1 | 3/2011 | Amin |
| 2011/0060780 A1 | 3/2011 | Berkley et al. |
| 2013/0218974 A1 | 8/2013 | Cao et al. |
| 2013/0275351 A1 | 10/2013 | Cantin |
| 2013/0282636 A1 | 10/2013 | Macready et al. |
| 2014/0025606 A1 | 1/2014 | Macready |
| 2014/0187427 A1 | 7/2014 | Macready et al. |
| 2014/0223224 A1 | 8/2014 | Berkley |
| 2014/0250288 A1 | 9/2014 | Roy |
| 2014/0324933 A1 | 10/2014 | Macready et al. |
| 2014/0344322 A1 | 11/2014 | Ranjbar |
| 2015/0006443 A1 | 1/2015 | Rose et al. |
| 2015/0032993 A1 | 1/2015 | Amin et al. |
| 2015/0161524 A1 | 6/2015 | Hamze |
| 2015/0193692 A1 | 7/2015 | Israel |
| 2015/0205759 A1 | 7/2015 | Israel et al. |
| 2015/0262073 A1 | 9/2015 | Lanting |
| 2015/0269124 A1 | 9/2015 | Hamze et al. |
| 2015/0310350 A1 | 10/2015 | Niskanen et al. |
| 2015/0363708 A1 | 12/2015 | Amin et al. |
| 2016/0042294 A1 | 2/2016 | Macready et al. |
| 2016/0071021 A1 | 3/2016 | Raymond |
| 2016/0085616 A1 | 3/2016 | Berkley |
| 2016/0132785 A1 | 5/2016 | Amin et al. |
| 2016/0217594 A1 | 7/2016 | Petschke et al. |
| 2016/0321559 A1 | 11/2016 | Rose et al. |
| 2016/0328253 A1 | 11/2016 | Majumdar |
| 2016/0335558 A1 | 11/2016 | Bunyk et al. |
| 2016/0335560 A1 | 11/2016 | Mohseni et al. |
| 2016/0343932 A1 | 11/2016 | Mohseni et al. |
| 2017/0161612 A1 | 6/2017 | Hastings et al. |
| 2017/0177534 A1 | 6/2017 | Mohseni et al. |
| 2017/0255629 A1 | 9/2017 | Thom et al. |
| 2017/0264373 A1 | 9/2017 | Krovi et al. |
| 2018/0196780 A1 | 7/2018 | Amin et al. |
| 2018/0218279 A1 | 8/2018 | Lechner et al. |
| 2018/0246848 A1 | 8/2018 | Douglass et al. |
| 2018/0276556 A1 | 9/2018 | Garrison et al. |
| 2019/0019099 A1 | 1/2019 | Hoskinson et al. |
| 2019/0080255 A1 | 3/2019 | Allen et al. |
| 2019/0258952 A1 | 8/2019 | Denchev |
| 2019/0266510 A1 | 8/2019 | Yarkoni et al. |
| 2020/0226197 A1 | 7/2020 | Woerner et al. |
| 2020/0234172 A1 | 7/2020 | King et al. |
| 2020/0257987 A1 | 8/2020 | Mcgeoch et al. |
| 2020/0311589 A1 | 10/2020 | Ollitrault et al. |
| 2020/0342548 A1 | 10/2020 | Mazed et al. |
| 2021/0279631 A1 | 9/2021 | Pichler et al. |
| 2022/0101170 A1 | 3/2022 | Denchev |

FOREIGN PATENT DOCUMENTS

| | | |
|---|---|---|
| WO | 2005093649 A1 | 10/2005 |
| WO | 2007085074 A1 | 8/2007 |
| WO | 2015103375 A1 | 7/2015 |
| WO | 2016029172 A1 | 2/2016 |
| WO | 2016183213 A1 | 11/2016 |
| WO | 2016210018 A1 | 12/2016 |
| WO | 2017075246 A1 | 5/2017 |

OTHER PUBLICATIONS

Zick et al., "Experimental quantum annealing: case study involving the graph isomorphism problem," arXiv (Mar. 2015) (Year: 2015).*
King et al., "Benchmarking a Quantum Annealing Processor with the Time-to-Target Metric," arXiv (2015) (Year: 2015).*
Kristen L. Pudenz, "Parameter Setting for Quantum Annealers," IEEE (Sep. 2016) (Year: 2016).*
Altshuler, et al., "Anderson localization casts clouds over adiabatic quantum optimization", arXiv:0912.0746v1 [quant-ph] Dec. 3, 2009, 14 pages.
Amin et al., "Quatum Boltzmann Machine". arXiv:1601.02036v1, Jan. 8, 2016.
Amin, M., "Searching for Quantum Speedup in Quasistatic Quantum Annealers," arXiv:1503.04216v2 [quant-ph] Nov. 19, 2015, 5 pages.
Berkley, A.J. et al., "Tunneling Spectroscopy Using a Probe Qubit," arXiv:1210.6310v2 [cond-mat.supr-con], Jan. 3, 2013, 5 pages.
Blume-Kohout et al., "Streaming Universal Distortion-Free Entanglement Concentration"; IEEE Transactions on Information Theory Year: 2014; vol. 60, Issue 1; Journal Article' Publisher: IEEE; 17 pages.

(56) References Cited

OTHER PUBLICATIONS

Bocko et al., "Prospects for Quantum Coherent Computation Using Superconducting Electronics," IEEE Transactions on Applied Superconductivity 7(2):3638-3641, Jun. 1997.
Brown, et al., "A fault-tolerant non-Clifford gate for the surface code in two dimensions", Science Advances, May 22, 2020, vol. 6, Issue 21, 25 pages.
Byrd. "A Limited-Memory Algorithm For Bound-Contrained Optimization". SIAM Journal on Scientific Computing, Jun. 17, 2005.
Calderbank, et al., "Good quantum error-correcting codes exist", Phys. Rev. A54, 1098—Published Aug. 1, 2996, 4 pages.
Chancellor, "Modernizing Quantum Annealing Using Local Searches", arXiv:1606.06833v1 [quant-ph] Jun. 22, 2016, 22 pages.
Childs, "Quantum Information Processing in Continuous Time", MIT (2004) Thesis (Year:2004), 140 pages.
Chiorescu, et al. "Coherent Quantum Dynamics of a Superconducting Flux Qubit", arXiv:cond-mat/0305461v1, May 20, 2003.
Clarke et al., "Superconducting quantum bits," Nature 453:1031-1042, Jun. 19, 2008.
Clausen, J., "Branch and Bound Alogrithms", Mar. 12, 1999, 30 pages.
Devoret et al., "Superconducting Circuits for Quantum Information: An Outlook," Science 339:1169-1174, Mar. 8, 2013.
Devoret et al., "Superconducting Qubits: A Short Review," arXiv:cond-mat/0411174v1, Nov. 7, 2004, 41 pages.
Dickson et al., "Thermally Assisted Quantum Annealing of a 16-Qubit Problem," Nature Communications, 2013, 6 pages.
Harris et al., "Experimental Demonstration of a Robust and Scalable Flux Qubit," arXiv:0909.4321v1, Sep. 24, 2009, 20 pages.
Harris et al., "Experimental Investigation of an Eight-Qubit Unit Cell in a Superconducting Optimization Processor," arXiv:1004.1628v2, Jun. 28, 2010, 16 pages.
Hen et al., "Solving the Graph Isomorphism Problem with a Quantum Annealer," arXiv:1207.1712v2, Aug. 8, 2012, 9 pages.
International Search Report for PCT Application No. PCT/US2017/036387 dated Oct. 20, 2017, 3 pages.
Johnson et al., "Scalable Control System for a Superconducting Adiabatic Quantum Optimization Processor," arXiv:0907.3757v1. Jul. 22, 2009. [online] Available. chrome-extension://efaidnbmnnnibpcajpcglclefindmkaj/https://arxiv.org/pdf/0907.3757v1.pdf.
Johnson et al., "Quantum annealing with manufactured spins," Nature 473:194-198, May 12, 2011.
Kerman et al., "Quantum Enhanced Optimization: Experimental Study Overview", IARPA, Oct. 26, 2015.
Knill, Fault-Tolerant Postselected Quantum Computation: Schemes, arXiv:quant-ph/0402171v1, Feb. 23, 2004, 17 pages.
Krzakala et al., On the path integral representation for quantum spin models and its application to the quantum cavity method and to Monte Carlo simulations, arXiv:0807.2553v2[cond-mat.stat-mech], Oct. 21, 2008.
Lanting et al., "Entanglement in a Quantum Annealing Processor," Physical Review X 4:021041, 2014. (14 pages).
Mohseni, et al., "Environment-Assisted Quantum Walks in Photosynthetic Energy Transfer", arXiv: 0805.2741v2 [quant-ph] Oct. 14, 2008, 9 pages.

Nagayama, et al., "Sureface code error correction on a defective lattice", IOP Publishing, New J. Phys. 19 (2017) 29 pages.
Neal, Radford M., "Annealed Importance Sampling", arXiv:physics/9803008v2 [physics.comp-ph], Sep. 4, 1998, 25 pages.
Non Final Office Action for U.S. Appl. No. 16/785,125, mailed Aug. 8, 2022, 8 pages.
Non Final Office Action for U.S. Appl. No. 16/858,108, mailed Sep. 21, 2022, 24 pages.
Notice of Allowance for U.S. Appl. No. 16/858,108, mailed Aug. 22, 2023, 12 pages.
Notice of Allowance for U.S. Appl. No. 17/584,600, mailed Jan. 19, 2023, 10 pages.
Zagoskin et al., "Superconducting Qubits," arXiv:0805.0164v1, May 1, 2008.
Notice of Allowance for U.S. Appl. No. 18/137,271, mailed Dec. 8, 2023, 8 pages.
Oliver, "Quantum Enhanced Optimization: Experimental Study Overview", IARPA, Oct. 26, 2015.
Propson, T., "Robust Quantum Optimal Control", arXiv:2103.15716v1, Mar. 29, 2021. 14 pages.
Pudenz, et al., "Error corrected quantum annealing with hundreds of qubits", arXiv:1307.8190v1 [quant-ph] Jul. 31, 2013, 18 pages.
Santra, et al., "Exponential capacity of associative memories under quantum annealing recall," arXiv:1602.0819 [quant-ph] Feb. 25, 2016, 9 pages.
Somma, et al., "Quantum Speedup by Quantum Annealing", Physical Review Letters (2012) (year:2012), 5 pages.
Temme, et al., "Error mitigation for short-depth quantum circuits", arXiv:1612.02058v3 [quant-ph], Nov. 6, 2017.
Wikipedia "Ancila bit" page from date Dec. 17, 2017, retrieved using the Way Back Machine, from https:web.archive.org/web/20171217060019/https://en.wikipedia.org/wiki/Ancilla_bit(Year:2017).
Wikipedia "Quantum error Correction bit" page from date Dec. 17, 2017, retrieved using the Way Back Machine, from Https://web.archive.org/web/20171217055958/https://en./wikipedia.org/wiki/quantum_erro_correction(year:2017).
Written Opinion for PCT Application No. PCT/US2017/036387 dated Oct. 20, 2017, 11 pages.
King, et al., "Performance of a Quantum Annealer on Range-limited Constraint Satisfaction Problems", arXiv:1502.02098v2 [quant-ph], Sep. 3, 2015.
Young et al., "Adiabatic quantum optimization with the wrong Hamiltonian", arXiv, Oct. 2, 2013.
Johnson et al., "Supplementary Information: Quantum annealing with manufactured spins," Nature 473:s1-s20, May 12, 2011.
Johnson, et al; "A scalable control system for a superconducting adiabatic quantum optimization processor", Superconductor Science and Technology; IOP Publishing; Supercond. Sci. Technol. 23 (2010); vol. 23, No. 6, Jun. 1, 2010, 12 pages.
Morita, et al., "Mathematical Foundation of Quantum Annealing", arXiv:0806.1859v1 [quant-ph] Jun. 11, 2008, 51 pages.
Venturelli et al., "Quantum Optimization of Fully-Connected Spin Glasses", arXiv, Jun. 29, 2014.
Zagoskin-Superconducting Qubits, La Physique au Canada 63(4):215-227, 2007.
Boixo, et al., "Computational Role of Multiqubit Tunneling in a Quantum Annealer", arXiv:1502.05754v1 [quant-ph], Feb. 20, 2015, pp. 1-7.

\* cited by examiner

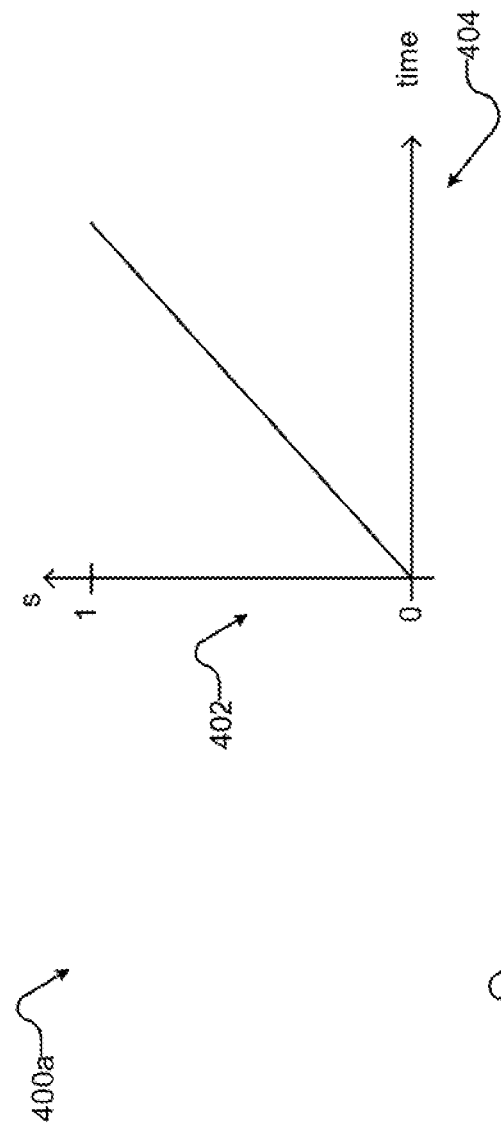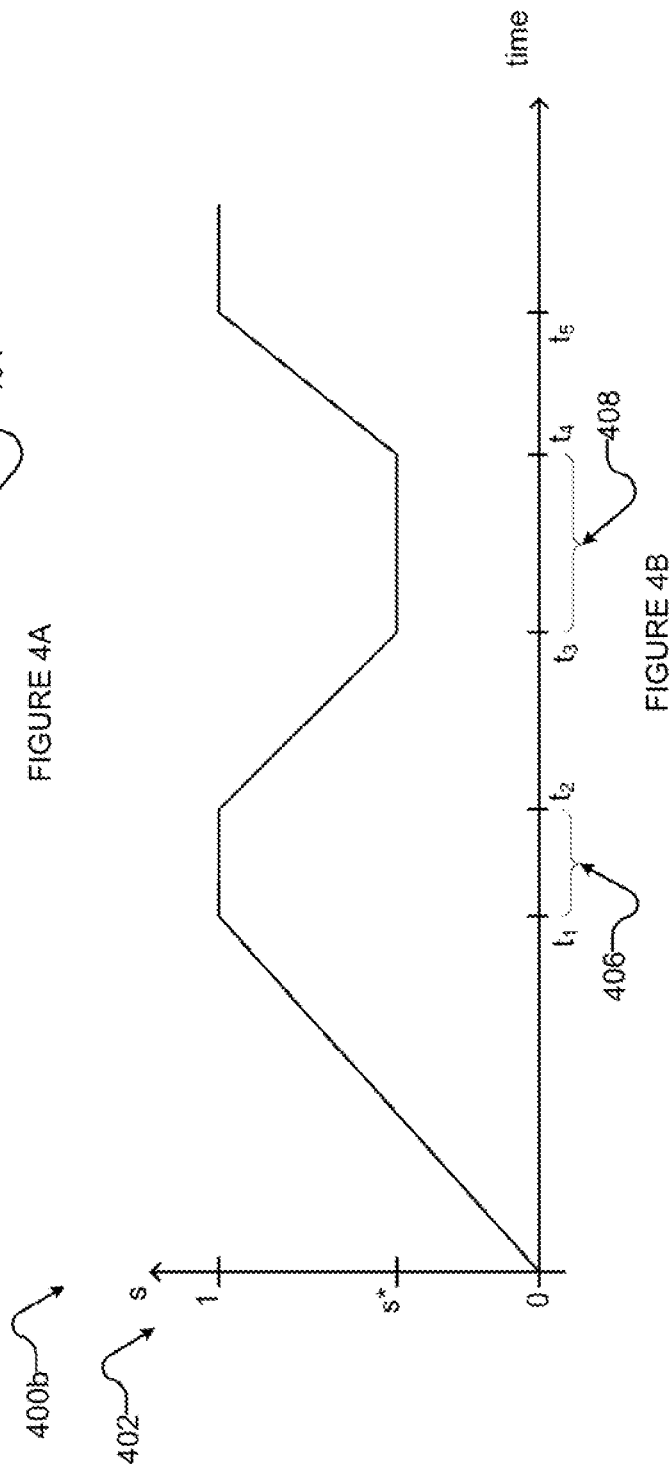

SYSTEMS AND METHODS FOR PERFORMING QUANTUM EVOLUTION IN QUANTUM COMPUTATION

FIELD

This disclosure generally relates to systems, devices, methods, and articles for quantum computation, and, in particular, for quantum annealing, and for training Quantum Boltzmann Machines and Restricted Boltzmann Machines, with applications, for example, in machine learning.

Boltzmann Machines

A Boltzmann machine is an implementation of a probabilistic graphical model that includes a graph with undirected weighted edges between vertices. The vertices (also called units) follow stochastic decisions about whether to be in an "on" state or an "off" state. The stochastic decisions are based on the Boltzmann distribution. Each vertex has a bias associated with the vertex. Training a Boltzmann machine includes determining the weights and the biases.

Boltzmann machines can be used in machine learning because they can follow simple learning procedures. For example, the units in a Boltzmann machine can be divided into visible units and hidden units. The visible units are visible to the outside world, can be divided into input units and output units. The hidden units are hidden from the outside world. There can be more than one layer of hidden units. If a user provides a Boltzmann machine with a plurality of vectors as input, the Boltzmann machine can determine the weights for the edges, and the biases for the vertices, by incrementally adjusting the weights and the biases until the machine is able to generate the plurality of input vectors with high probability. In other words, the machine can incrementally adjust the weights and the biases until the marginal distribution over the variables associated with the visible units of the machine matches an empirical distribution observed in the outside world, or at least, in the plurality of input vectors.

In a Restricted Boltzmann Machine, there are no intralayer edges (or connections) between units. In the case of a RBM comprising a layer of visible units and a layer of hidden units, there are no edges between the visible units, and no edges between the hidden units.

The edges between the visible units and the hidden units can be complete (i.e., fully bipartite) or less dense.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are quantum binary digits, known as qubits. Quantum computers hold the promise of providing exponential speedup for certain classes of computational problems such as computational problems simulating quantum physics. Useful speedup may exist for other classes of problems.

One model of quantum computing is adiabatic quantum computing. Adiabatic quantum computing can be suitable for solving hard optimization problems, for example. Further details on adiabatic quantum computing systems, methods, and apparatus are described, for example, in U.S. Pat. Nos. 7,135,701; and 7,418,283.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing. In quantum annealing thermal effects and other noise may be present. The final low-energy state may not be the global energy minimum.

Adiabatic quantum computation may be considered a special case of quantum annealing. In adiabatic quantum computation, ideally, the system begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of delocalization, sometimes called disorder, during the annealing process.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to be able to process at least some problems having size and/or connectivity greater than (and/or at least not fully provided by) the working graph of an analog processor. Computational systems and methods are described which, at least in some implementations, allow for the computation of at least some problem graphs which have representations which do not fit within the working graph of an analog processor (e.g., because problem graph representations require more computation devices and/or more/other couplers than the processor provides).

A computational method is performed via a hybrid processor comprising an analog processor and a digital processor. The method may be summarized as including determining a first classical spin configuration via the digital processor, receiving an Ising problem via the digital processor, determining preparatory biases toward the first classical spin configuration via the digital processor, programming the Ising problem and the preparatory biases in the analog processor via the digital processor; evolving the analog processor in a first direction until the analog processor reaches the first classical spin configuration; latching the state of the analog processor for a first dwell time; programming the analog processor to remove the preparatory biases via the digital processor, determining a tunneling energy via the digital processor, determining a second dwell time via the digital processor; evolving the analog processor in a second direction until the analog processor reaches the tunneling energy, wherein the second direction is opposite the first direction, pausing the analog processor for the second dwell time, and evolving the analog processor in the first direction until the analog processor reaches a second classical spin configuration.

The computational method may further include reading out the state of the analog processor via the digital processor.

The analog processor may be a quantum processor and evolving the analog processor in a first direction may include evolving the quantum processor in the first direction.

Programming the Ising problem and the preparatory bias in the quantum processor may include programming at least the most significant digit of each qubit flux bias DACs.

Latching the state of the analog processor for a first dwell time may include latching the state of the analog processor for at least the time needed to program the analog processor to remove the preparatory biases.

The second dwell time may not be equal the first dwell time.

The second classical spin configuration may be different from the first classical spin configuration.

The computational method may further include determining whether an exit condition has been met, and iteratively repeating, until an exit condition is met, programming the preparatory biases, evolving the analog processor in a first direction until the analog processor reaches the first classical spin configuration, latching the state of the analog processor by the first dwell time, programming the analog processor by removing the preparatory biases, evolving the analog processor in a second direction until the analog processor reaches the tunneling energy, pausing the analog processor by the second dwell time, and evolving the analog processor in the first direction until the analog processor reaches a subsequent classical spin configuration.

An exit condition may include completing a defined number of iterations.

The computational method may further include determining annealing rates for the analog processor via the digital processor.

The annealing rates of evolution in the first direction may be different from the annealing rates of evolution in the second direction.

The computational method may include evolving a plurality of qubits of the quantum processor in the first direction, and evolving at least a subset of the plurality of qubits of the quantum processor in the second direction.

A system for use in quantum processing may be summarized as including at least one hybrid processor comprising at least one analog processor, and at least one digital processor. The at least one digital processor determines a first classical spin configuration for the at least one analog processor, receives an Ising problem, a set of normalized evolution coefficients s* and a set of dwell times t*, determines preparatory biases toward the first classical spin configuration, programs the Ising problem and the preparatory biases in the at least one analog processor, causes the at least one analog processor to evolve in a first direction until the at least one analog processor reaches the first classical spin configuration, latches the state of the at least one analog processor by a first dwell time, programs the at least one analog processor to remove the preparatory biases. The at least one digital processor may cause the at least one analog processor to evolve in a second direction until a normalized evolution coefficient s* is reached, wherein the second direction is opposite the first direction, pause the at least one analog processor for a dwell time t*, and cause the at least one analog processor to evolve in the first direction until the at least one analog processor reaches a second classical spin configuration. The at least one digital processor may determine whether an exit condition has been met. The at least one digital processor may iteratively repeat, until the exit condition has been met, causing the at least one analog processor to evolve in a second direction until a normalized evolution coefficient s* is reached, wherein the second direction is opposite the first direction, pausing the at least one analog processor for a dwell time t*, causing the at least one analog processor to evolve in the first direction until the at least one analog processor reaches a subsequent classical spin configuration, and determining whether the exit condition has been met.

An exit condition may be indicated as completion of a number of iterations equal to the size of the set of normalized evolution coefficient s*.

In various of the described implementations, the analog processor may be a quantum processor.

The at least one digital processor may cause a plurality of qubits of the quantum processor to evolve in the first direction, and the at least one digital processor may cause at least a subset of the plurality of qubits to evolve in the second direction.

A computational method is performed via a hybrid processor comprising an analog processor and a digital processor.

The computational method may be summarized as including determining a first classical spin configuration via the digital processor, receiving an Ising problem, a set of normalized evolution coefficients s* and a set of dwell times t* via the digital processor, determining preparatory biases toward the first classical spin configuration via the digital processor, programming the Ising problem in the analog processor via the digital processor. The computational method comprises programming the preparatory biases in the analog processor via the digital processor, evolving the analog processor in a first direction until the analog processor reaches the first classical spin configuration, latching the state of the analog processor by a first dwell time, programming the analog processor to remove the preparatory biases via the digital processor, evolving the analog processor in a second direction until an normalized evolution coefficient s* is reached, wherein the second direction is opposite the first direction, pausing the analog processor for a dwell time t*, and evolving the analog processor in the first direction until the analog processor reaches a second classical spin configuration. The digital processor may determine whether an exit condition has been met. The digital processor may iteratively repeat, until the exit condition has been met, the evolving of the analog processor in a second direction until an normalized evolution coefficient s* is reached, wherein the second direction is opposite the first direction, the pausing of the analog processor for a dwell time t*, the evolving of the analog processor in the first direction until the analog processor reaches a subsequent classical spin configuration, and the determining of whether the exit condition has been met.

An exit condition may include completing a defined number of iterations equal to the size of the set of normalized evolution coefficient s*.

In various of the described methods, the analog processor may be a quantum processor.

The computational method may include evolving a plurality of qubits of the quantum processor in the first direction, and evolving at least a subset of the plurality of qubits of the quantum processor in the second direction.

A computational method is performed via an analog processor. The method may be summarized as including determining via a digital processor a set of candidate evolution schedules for a set of intervals i of a normalized evolution coefficient s, iteratively repeating for each interval i of the normalized evolution coefficient s: iteratively repeating until an exit condition has been met programming the analog processor with a candidate evolution schedule from the set of candidate evolution schedules via the digital processor, evolving the analog processor in a first direction from a value of the evolution coefficient $s_i$ to a value $s_{i+1}$, and evolving the analog processor in a second direction, wherein the second direction is opposite the first direction, until a value of the normalized evolution coefficient si is reached.

The analog processor may be a quantum processor.

The method may further include determining whether the exit condition has been met, where the exit condition is completion if a defined number of iterations equal to the number of elements in the set of candidate evolution schedules for each interval i.

The method may further include reading out the state of the analog processor before determining whether the exit condition has been met.

The method may further include determining via the digital processor an evolution schedule for each interval of the normalized evolution coefficient, based at least in part of the readout.

A system for use in quantum processing may be summarized as including at least one digital processor which determines a set of candidate evolution schedules for a set of intervals i of a normalized evolution coefficient s, and iteratively repeats for each interval i of the normalized evolution coefficient: iteratively repeats until an exit condition has been met programming an analog processor with a candidate evolution schedule from the set of candidate evolution schedules, causing the analog processor to evolve in a first direction from a value of the evolution coefficient $s_i$ to a value $s_{i+1}$, and causing the analog processor to evolve in a second direction, wherein the second direction is opposite the first direction, until a value of the normalized evolution coefficient $s_i$ is reached.

The analog processor may be a quantum processor.

The exit condition may be the completion of a number of iterations equal to the number of elements in the set of candidate evolution schedules for each interval i and the at least one digital processor may further determine whether the number of iterations equal to the number of elements in the set of candidate evolution schedules for each interval i have been completed.

The at least one digital processor may further read out the state of the analog processor before the at least one digital processor determines whether the exit condition has been met.

The at least one digital processor may further determine an evolution schedule for each interval of the normalized evolution coefficient, based at least in part of the readout.

A computational method is performed via an analog processor.

The method may be summarized as including determining via a digital processor a set of candidate chain strengths for a set of intervals i of a normalized evolution coefficient s, iteratively repeating for each interval i of the normalized evolution coefficient iteratively repeating until an exit condition has been met: programming the analog processor with a candidate chain strength from the set of candidate chain strengths via the digital processor, evolving the analog processor in a first direction from a value of the evolution coefficient $s_i$ to a value $s_{i+1}$, and evolving the analog processor in a second direction, wherein the second direction is opposite the first direction, until a value of the normalized evolution coefficient $s_i$ is reached.

The analog processor may be a quantum processor.

The method may further include determining whether an exit condition has been met, where the exit condition is completion of a defined number of iterations equal to the number of elements in the set of candidate evolution schedules for each interval i.

The method may further include reading out the state of the analog processor before determining whether the exit condition has been met.

The method may further comprise determining via the digital processor a chain strength for each interval of the normalized evolution coefficient, based at least in part of the readout.

A system for use in quantum processing may be summarized as comprising at least one digital processor which determines a set of candidate chain strengths for a set of intervals i of a normalized evolution coefficient s, and iteratively repeats for each interval i of the normalized evolution coefficient iteratively repeats until an exit condition has been met: programming an analog processor with a candidate chain strength from the set of candidate chain strengths, causing the analog processor to evolve in a first direction from a value of the evolution coefficient $s_i$ to a value $s_{i+1}$, and causing the analog processor to evolve in a second direction, wherein the second direction is opposite the first direction, until a value of the normalized evolution coefficient si is reached.

The analog processor may be a quantum processor.

The exit condition may be the completion of a number of iterations equal to the number of elements in the set of candidate chain strengths for each interval i and the at least one digital processor further determines whether the number of iterations equal to the number of elements in the set of candidate evolution schedules for each interval i have been completed.

The at least one digital processor reads out the state of the analog processor before the at least one digital processor determines whether the exit condition has been met.

A hybrid computer for generating samples that can be used in machine learning may be summarized as including: a digital computer comprising at least one nontransitory processor-readable medium that stores a set of calculation instructions and at least one processor operable to execute the set of calculation instructions to perform post-processing; and an analog computer communicatively coupled to the digital computer, the analog computer comprising a plurality of qubits and one or more coupling devices that selectively provide communicative coupling between pairs of the qubits, the analog computer operable to return one or more samples corresponding to low-energy configurations of a Hamiltonian, wherein at least a subset of the one or more samples is provided to the digital computer for post-processing, wherein post-processing of the one or more samples by the at least one processor includes at least one of applying quantum Monte Carlo post-processing to the one or more samples, and applying annealed importance sampling to the one or more samples. The analog computer may be a quantum annealer. In various of the described implementations, the plurality of qubits may include a plurality of superconducting qubits.

A method of generating samples from a quantum Boltzmann distribution to train a Quantum Boltzmann Machine may be summarized as including: collecting one or more samples from a physical quantum annealer; receiving by a digital computer the one or more samples from the physical quantum annealer; and applying by the digital computer quantum Monte Carlo post-processing to the one or more samples. Collecting one or more samples from a physical quantum annealer may include quantum annealing by a quantum processor comprising a plurality of qubits, and reading out the plurality of qubits via a read-out system. In various of the described methods, the plurality of qubits may include a plurality of superconducting qubits. Collecting one or more samples from a physical quantum annealer may include collecting one or more samples corresponding to low-energy configurations of a Hamiltonian.

A method of generating samples from a classical Boltzmann distribution to train a Restricted Boltzmann Machine may be summarized as including: collecting one or more samples from a physical quantum annealer, wherein the physical quantum annealer is communicatively coupled to a digital computer; receiving by the digital computer the one or more samples from the physical quantum annealer; applying by the digital computer quantum Monte Carlo post-processing to the one or more samples to generate one or more post-processed samples from a quantum Boltzmann distribution; and applying by the digital computer annealed importance sampling to the one or more post-processed samples from the quantum Boltzmann distribution. Collecting one or more samples from a physical quantum annealer may include quantum annealing by a quantum processor comprising a plurality of qubits, and reading out the plurality of qubits via a read-out system. In various of the described methods, the plurality of qubits may include a plurality of superconducting qubits. Collecting one or more samples from a physical quantum annealer may include collecting one or more samples corresponding to low-energy configurations of a Hamiltonian.

A method of generating samples from a classical Boltzmann distribution to train a Restricted Boltzmann Machine may be summarized as including: collecting one or more samples from a physical thermal annealer, wherein the physical thermal annealer is communicatively coupled to a digital computer; receiving by the digital computer the one or more samples from the physical thermal annealer; applying by the digital computer classical Monte Carlo post-processing to the one or more samples to generate one or more post-processed samples. In some embodiments, the method includes applying by the digital computer annealed importance sampling to the one or more post-processed samples.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

FIG. 4A is a graph showing an evolution of an analog processor where the normalized evolution coefficient increases over time.

FIG. 4B is a graph showing an exemplary evolution of an analog processor where the normalized evolution coefficient increases and decreases over time during the course of an annealing schedule.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Hybrid Computing System Comprising a Quantum Processor

Figure 1:
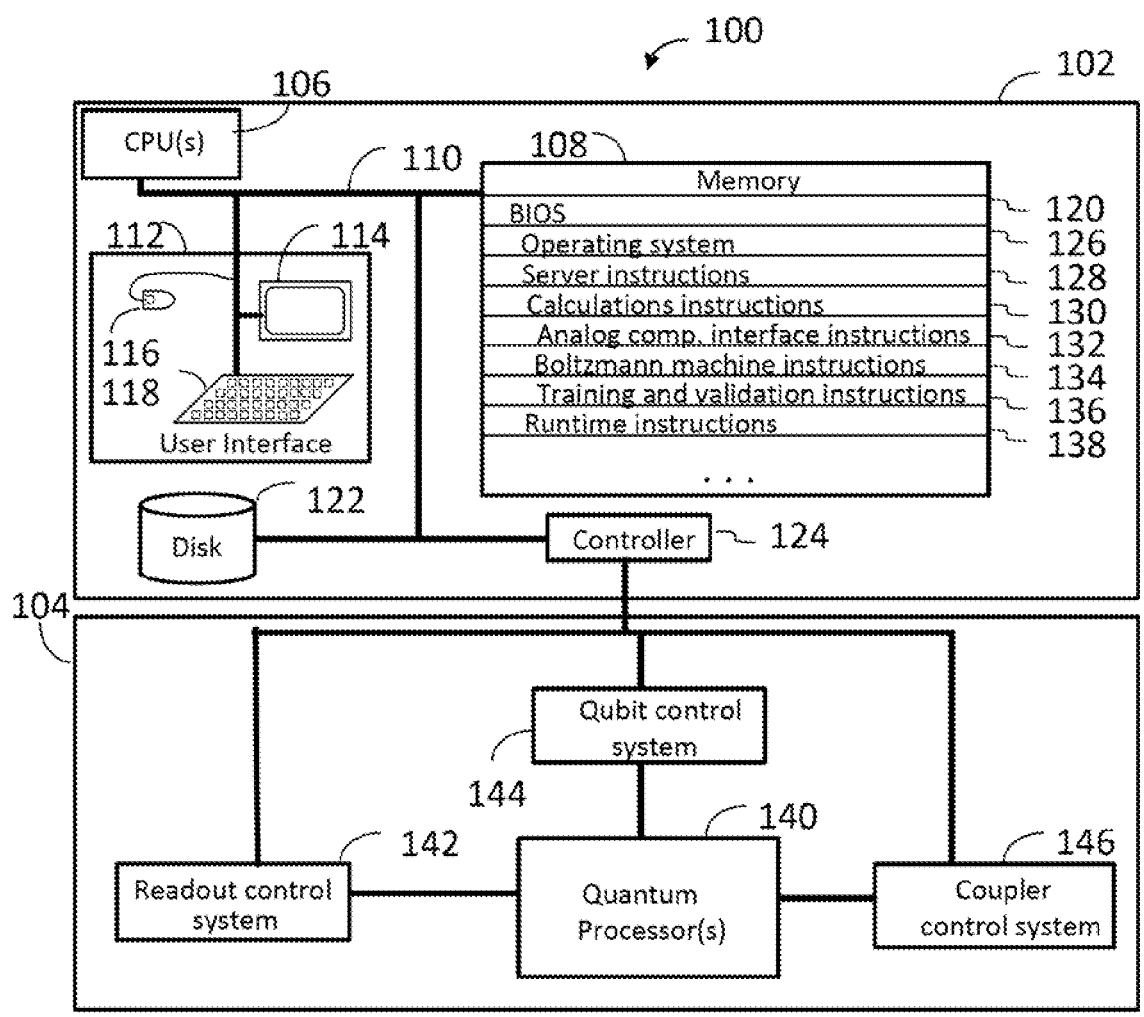
FIG. 1 is a schematic diagram that illustrates an exemplary hybrid computer including a digital computer and an analog computer in accordance with the present systems, devices, articles, and methods.

FIG. 1 illustrates a hybrid computing system 100 including a digital computer 102 coupled to an analog computer 104. In some implementations, the analog computer 104 is a quantum computer and the digital computer 102 is a classical computer.

The exemplary digital computer 102 includes a digital processor (such as one or more central processor units 106) that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 102 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer- or processor-readable instructions (sometimes known as program modules), application programs and/or data, may be located in both local and remote memory storage devices (e.g., nontransitory computer- or processor-readable media).

Digital computer 102 may include at least one or more digital processors (e.g., one or more central processor units 106), one or more system memories 108, and one or more system buses 110 that couples various system components, including system memory 108 to central processor unit 106.

The digital processor may be any logic processing unit, such as one or more central processing units ("CPUs") with one or more cores, graphics processing units ("GPUs"), digital signal processors ("DSPs"), application-specific integrated circuits ("ASICs"), field-programmable gate arrays ("FPGAs"), programmable logic controllers (PLCs), etc.

Digital computer 102 may include a user input/output subsystem 112. In some implementations, the user input/output subsystem includes one or more user input/output components such as a display 114, mouse 116, and/or keyboard 118. System bus 110 can employ any known bus structures or architectures, including a memory bus with a memory controller, a peripheral bus, and a local bus. System memory 108 may include non-volatile memory, for example one or more of read-only memory ("ROM"), static random access memory ("SRAM"), Flash NAND; and volatile memory, for example random access memory ("RAM") (not shown), all of which are examples of nontransitory computer- or processor-readable media.

A basic input/output system ("BIOS") 120, which can form part of the ROM, contains basic routines that help transfer information between elements within digital computer 102, such as during startup.

Digital computer 102 may also include other non-volatile memory 122. Non-volatile memory 122 may take a variety of forms, including: a hard disk drive for reading from and writing to a hard disk, an optical disk drive for reading from and writing to removable optical disks, and/or a magnetic disk drive for reading from and writing to magnetic disks, all of which are examples of nontransitory computer- or processor-readable media. The optical disk can be a CD-ROM or DVD, while the magnetic disk can be a magnetic floppy disk or diskette. Non-volatile memory 122 may communicate with digital processor via system bus 110 and may include appropriate interfaces or controllers 124 coupled to system bus 110. Non-volatile memory 122 may serve as nontransitory long-term storage for computer- or processor-readable instructions, data structures, or other data (also called program modules) for digital computer 105.

Although digital computer 102 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc., all of which are further examples of nontransitory computer- or processor-readable media. Those skilled in the relevant art will appreciate that some computer architectures conflate volatile memory and non-volatile memory. For example, data in volatile memory can be cached to non-volatile memory, or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In Line Memory Modules.

Various sets of computer- or processor-readable instructions (also called program modules), application programs and/or data can be stored in system memory 108. For example, system memory 108 may store an operating system 126, and a set of computer- or processor-readable server instructions (i.e., server modules) 128. In some implementations, server module 128 includes instructions for communicating with remote clients and scheduling use of resources including resources on the digital computer 102 and analog computer 104. For example, a Web server application and/or Web client or browser application for permitting digital computer 102 to exchange data with sources via the Internet, corporate Intranets, or other networks, as well as with other server applications executing on server computers.

In some implementations, system memory 108 may store a set of computer- or processor-readable calculation instructions (i.e., calculation module 130) to perform pre-processing, co-processing, and post-processing to analog computer 104.

In some implementations, system memory 108 may store post-processing instructions, or make use of the instructions in calculation instructions module 130. Execution of the post-processing instructions can cause a processor (such as CPU 106) to perform post-processing in digital computer 102. For example, digital computer 102 can perform post-processing of samples obtained from analog computer 104 based on post-processing instructions in calculation instructions module 130. Post-processing of samples from a physical quantum annealer, such as analog computer 104, is described in following sections of the present disclosure. Post-processing can include, for example, quantum Monte Carlo and/or annealed importance sampling.

In accordance with the present systems and methods, system memory 108 may store at set of analog computer interface modules 132 operable to interact with the analog computer 104.

In some implementations, system memory 108 may store a set of Boltzmann machine instructions or a Boltzmann machine module 134 to provide procedures and parameters for the operation of the analog computer 104 as a Boltzmann machine. For example, the Boltzmann machine module 134 can implement a method (such as method 300 of FIG. 3) on digital computer 102 and analog computer 104. The hybrid computer 100 following instructions in the Boltzmann machine module 134 can implement graphical representations of portions of Boltzmann machines.

In some implementations, system memory includes a set of training and validations instructions or training and validations instructions module 136. A Boltzmann machine can be trained via supervised or unsupervised learning. The hybrid computer 100 may implement training methods defined in the training and validations instructions module 136. As well, a Boltzmann machine once trained may need validating. The hybrid computer 100 may validate a Boltzmann machine following methods defined in the training and validations instructions module 136.

In some implementations, system memory 108 may store a set of runtime instructions or runtime instructions module 138 to provide executable procedures and parameters to deploy and/or monitor a Boltzmann machine.

While shown in FIG. 1 as being stored in system memory 108, the modules shown and other data can also be stored elsewhere including in non-volatile memory 122 or one or more other non-transitory computer- or processor-readable media.

The analog computer 104 can be provided in an isolated environment (not shown). For example, where the analog computer 104 is a quantum computer, the environment shields the internal elements of the quantum computer from heat, magnetic field, and the like. The analog computer 104 includes one or more analog processors 140. Examples of analog processor 140 include quantum processors such as those described below in reference to FIG. 2.

A quantum processor includes programmable elements such as qubits, couplers, and other devices. The qubits are read out via readout system 142. These results are fed to the various sets of computer- or processor-readable instructions for the digital computer 102 including server module 128, calculation module 130, analog computer interface modules 132, or other modules stored in non-volatile memory 122, returned over a network or the like. The qubits are controlled via qubit control system 144. The couplers are controlled via coupler control system 146. In some embodiments, the qubit control system 144 and the coupler control system 146 are used to implement quantum annealing, as described herein, on analog processor 140.

In some implementations, the digital computer 102 can operate in a networked environment using logical connections to at least one client computer system. In some implementations, the digital computer 102 is coupled via logical connections to at least one database system. These logical connections may be formed using any means of digital communication, for example, through a network, such as a local area network ("LAN") or a wide area network ("WAN") including, for example, the Internet. The networked environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 102 may be connected to the LAN through an adapter or network interface card ("NIC") (communicatively linked to system bus 110). When used in a WAN networked environment, digital computer 102 may include an interface and modem (not shown), or a device such as NIC, for establishing communications over the WAN. Non-networked communications may additionally, or alternatively, be employed.

In accordance with some embodiments of the present systems and devices, a quantum processor (such quantum processor 140) may be designed to perform quantum annealing and/or adiabatic quantum computation. An evolution Hamiltonian is constructed, that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and A(t), B(t) are coefficients that can control the rate of evolution, and typically lie in the range [0, 1].

In some implementations, a time-varying envelope function is placed on the problem Hamiltonian. A suitable delocalization Hamiltonian is given by:

$$H_D \propto -\frac{1}{2}\sum_{i=1}^{N} \Delta_i \sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms, and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z\sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, respectively, and $\varepsilon$ is a characteristic energy scale for $H_P$.

The $\sigma_i^z$ and $\sigma_i^z\sigma_j^z$ terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Exemplary Superconducting Quantum Processor for Quantum Annealing

Figure 2:
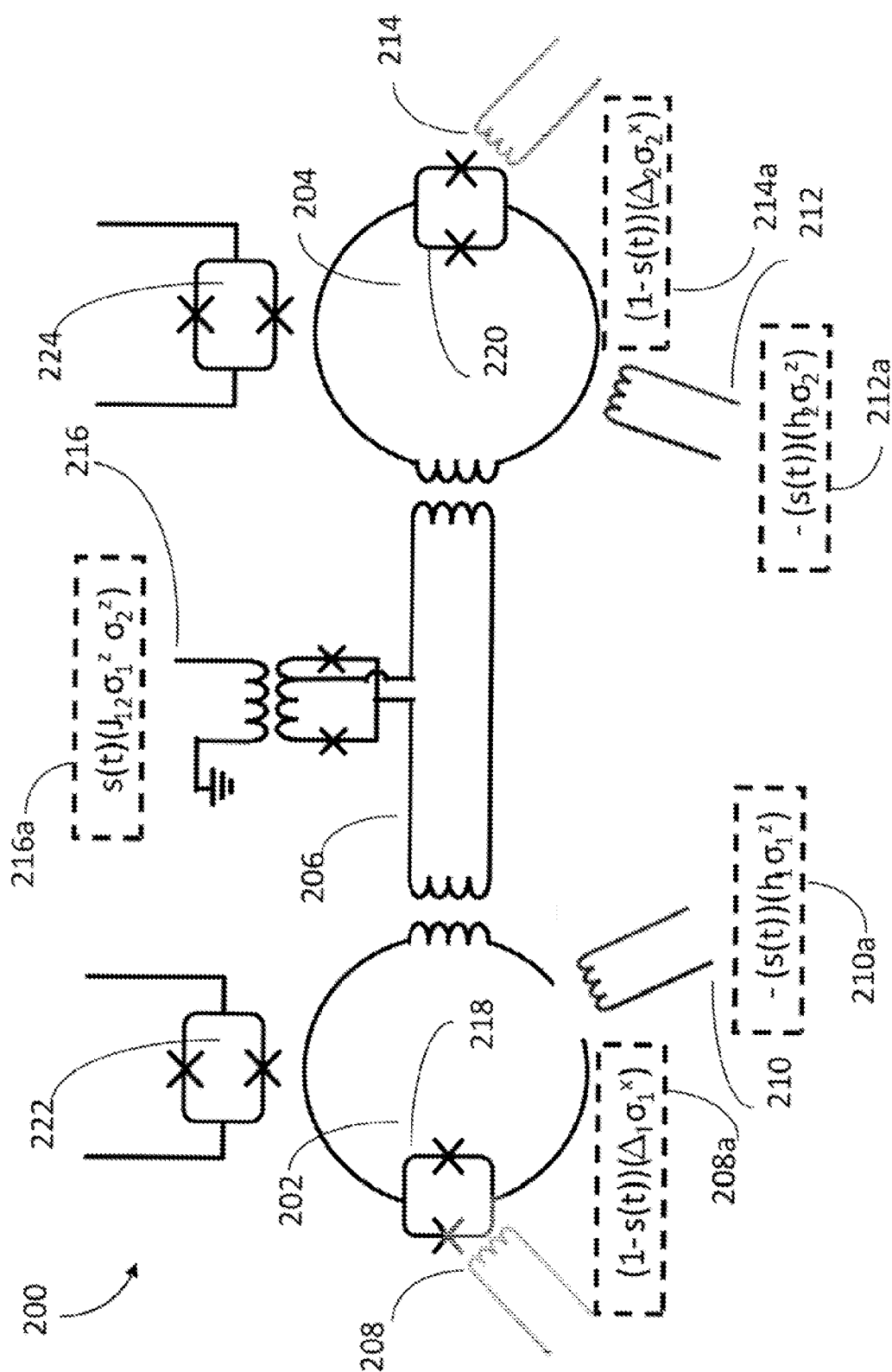
FIG. 2 is a schematic diagram that illustrates a portion of an exemplary superconducting quantum processor, suitable for implementing the analog computer of FIG. 1, designed for quantum annealing in accordance with the present systems, devices, articles, and methods.

FIG. 2 is a schematic diagram of a portion of an exemplary superconducting quantum processor 200 designed for quantum annealing (and/or adiabatic quantum computing) components from which may be used to implement the present systems and devices. The portion of superconducting quantum processor 200 shown in FIG. 2 includes two superconducting qubits 202, and 204. Also shown is a tunable $\sigma_i^z\sigma_j^z$ coupling (diagonal coupling) via coupler 210 therebetween qubits 202 and 204 (i.e., providing 2-local interaction). While the portion of quantum processor 200 shown in FIG. 2 includes only two qubits 202, 204 and one coupler 206, those of skill in the art will appreciate that quantum processor 200 may include any number of qubits and any number of couplers coupling information therebetween.

The portion of quantum processor 200 shown in FIG. 2 may be implemented to physically realize quantum annealing and/or adiabatic quantum computing. Quantum processor 200 includes a plurality of interfaces 208, 210, 212, 214, and 216 that are used to configure and control the state of quantum processor 200. Each of interfaces 208, 210, 212, 214, and 216 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. Nos. 7,876,248 and 8,035,540.

In the operation of quantum processor 200, interfaces 208 and 214 may each be used to couple a flux signal into a respective compound Josephson junction 218 and 220 of qubits 202 and 204, thereby realizing a tunable tunneling term (the $\Delta i$ term) in the system Hamiltonian. This coupling provides the off-diagonal $\sigma^x$ terms of the Hamiltonian and these flux signals are examples of "delocalization signals".

In some implementations, the tunneling term is selected to make a first portion of the qubits on the quantum processor more classical relative a second portion of the qubits. For example, qubit 202 may be a hidden unit in a Boltzmann machine and have a smaller tunneling term relative to qubit 204.

Similarly, interfaces 210 and 212 may each be used to apply a flux signal into a respective qubit loop of qubits 202 and 204, thereby realizing the hi terms in the system Hamiltonian. This coupling provides the diagonal $\sigma^z$ terms in the system Hamiltonian. Furthermore, interface 216 may be used to couple a flux signal into coupler 206, thereby realizing the $J_{ij}$ term(s) in the system Hamiltonian. This coupling provides the diagonal $\sigma_i^z\sigma_j^z$ terms in the system Hamiltonian.

In FIG. 2, the contribution of each of interfaces 208, 210, 212, 214, and 216 to the system Hamiltonian is indicated in boxes 208a, 210a, 212a, 214a, and 216a, respectively. As shown, in the example of FIG. 2, the boxes 208a, 210a, 212a, 214a, and 216a are elements of time-varying Hamiltonians for quantum annealing and/or adiabatic quantum computing.

Throughout this specification and the appended claims, the term "quantum processor" is used to generally describe a collection of physical qubits (e.g., qubits 202 and 204) and couplers (e.g., coupler 206). The physical qubits 202 and 204 and the coupler 206 are referred to as the "programmable elements" of the quantum processor 200 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 210, 212, and 216) used to apply the programmable parameters (e.g., the $h_i$ and $J_{ij}$ terms) to the programmable elements of the quantum processor 200 and other associated control circuitry and/or instructions.

As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 208 and 214) used to evolve the programmable elements of the quantum processor 200 and other associated control circuitry and/or instructions. For example, the evolution subsystem may include annealing signal lines and their corresponding interfaces (208, 214) to the qubits (202, 204).

Quantum processor 200 also includes readout devices 222 and 224, where readout device 222 is associated with qubit 202 and readout device 224 is associated with qubit 204. In some embodiments, such as shown in FIG. 2, each of readout devices 222 and 224 includes a DC-SQUID inductively coupled to the corresponding qubit. In the context of quantum processor 200, the term "readout subsystem" is used to generally describe the readout devices 222, 224 used to read out the final states of the qubits (e.g., qubits 202 and 204) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 2 illustrates only two physical qubits 202, 204, one coupler 206, and two readout devices 222, 224, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a superconducting flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997, IEEE Trans. on Appl. Supercond. 7, 3638; Friedman, et al., 2000, Nature 406, 43; and Harris, et al., 2010, Phys. Rev. B 81, 134510; or persistent current qubits, Mooij et al., 1999, Science 285, 1036; and Orlando et al., 1999, Phys. Rev. B 60, 15398. In addition, hybrid charge-phase qubits, where the energies are equal, may also be used. Further details of superconducting qubits may be found in Makhlin, et al., 2001, Rev. Mod. Phys. 73, 357; Devoret et al., 2004, arXiv:cond-mat/0411174; Zagoskin and Blais, 2007, Physics in Canada 63, 215; Clarke and Wilhelm, 2008, Nature 453, 1031; Martinis, 2009, Quantum Inf. Process. 8, 81; and Devoret and Schoelkopf, 2013, Science 339, 1169. In some embodiments, the qubits and couplers are controlled by on chip circuitry. Examples of on-chip control circuitry can be found in U.S. Pat. Nos. 7,876,248; 7,843,209; 8,018,244; 8,098,179; 8,169,231; and 8,786,476. Further details and implementations of exemplary quantum processors that may be used in conjunction with the present systems and devices are described in, for example, U.S. Pat. Nos. 7,533,068; 8,008,942; 8,195,596; 8,190,548; and 8,421,053.

Sampling Using a Physical Quantum Annealer

A physical quantum annealer (PQA) can be used to change the Hamiltonian of a quantum system, and can cause a change in a state of the quantum system. After annealing, the Hamiltonian of the quantum system can be similar, or the same, as a problem Hamiltonian $H_P$. The PQA can be an open system, i.e., a system that interacts with the environment. In the case of an open-system quantum annealer, the state can be at least an approximation to a thermal state of the quantum system. In the special case of an adiabatic quantum annealer (where the system is isolated from the environment), the state can be at least an approximation to the ground state of Hamiltonian $H_P$. The following paragraphs refer to an open-system quantum annealer.

The state of a PQA at normalized time t (where $t \in [0,1]$) can be described by a density matrix $\rho_{ij}(t)$, where i, j denote eigenstates of a Hamiltonian H(t). The state can be modeled by an equation of the form $\dot{\rho}_{ij} = -i[H,\rho] + F(\rho)$, where $F(\rho)$ is a linear matrix-valued function.

At the start of annealing, the density matrix is diagonal and the state of the PQA can be described by a quantum Boltzmann distribution. At an intermediate time during annealing $t^1$, the state of the quantum system can begin to deviate from the quantum Boltzmann distribution. One reason for the deviation can be a slowdown of open-system quantum dynamics.

The point at which the state begins to deviate from the quantum Boltzmann distribution can be referred to as the freeze-out point. Past that point the state will deviate from quantum Boltzmann distribution. There can be multiple freeze-out points $t^1 < t^2 < \ldots < t^n$ where the dynamics between progressively smaller subspaces of the state space slow down. If the points $t^1, \ldots t^n$ are sufficiently close to each other, the state of the PQA in the region $t \in [t^1, t^n]$ can be close to a quantum Boltzmann distribution.

The time up to which the state of the PQA is close to a quantum Boltzmann distribution can be denoted as $\bar{t}$. For normalized time $t > \bar{t}$, the state can increasingly deviate from a quantum Boltzmann distribution, and its evolution can be described as "running downhill" in the quantum configuration space, reaching equilibrium locally in subspaces while not necessarily reaching equilibrium globally.

The distribution corresponding to the state of the PQA at normalized time t can be denoted as p(t). For annealing parameters $\theta(t)$ at time t, the corresponding quantum Boltzmann distribution can be denoted as $p_{\theta(t)}^{QB}$. Samples returned by the PQA correspond to samples from distribution p(1). As described above, the distribution $p(\bar{t})$ can be close to $p_{\theta(\bar{t})}^{QB}$;

It can be impractical to obtain samples from the PQA at time $\bar{t}$, so, in practice, samples are typically obtained from the PQA in its final state after annealing.

Sampling from Intermediate Quantum Boltzmann Distributions Using a Physical Quantum Annealer A physical quantum annealer (PQA), such as a superconducting quantum processor described in reference to FIGS. 1 and 2, can return samples from the final distribution p(1). It can be beneficial to convert the samples from the final distribution p(1) to good-quality samples from an intermediate distribution $p(\bar{t}) \approx p_{\theta(\bar{t})}^{QB}$; Good-quality samples are samples meeting a determined threshold for closeness to true samples from a distribution. The good-quality samples can be used in applications requiring samples from a quantum Boltzmann distribution.

Furthermore, it can be beneficial to convert the good-quality samples from intermediate distribution $p_{\theta(\bar{t})}^{QB}$ to samples from another quantum Boltzmann distribution $p_{\theta(t)}^{QB}$, and/or to samples from a classical Boltzmann distribution.

In previous approaches, the samples from the final distribution p(1) obtained from a PQA were treated as though they came from an unknown distribution, and were post-processed (e.g., using a classical Markov Chain Monte Carlo method) to convert them to a classical Boltzmann distribution. A shortcoming of previous approaches is that little or no use is made of intermediate quantum distribution $p_{\theta(\bar{t})}^{QB}$ which contains global information about the final distribution p(1). Previous classical post-processing methods are local, and generally unable to affect global features of the distribution. Consequently, previous approaches to post-processing of samples obtained from a PQA can misrepresent global features of a classical Boltzmann distribution of interest.

Quantum Monte Carlo Post-Processing

The presently disclosed systems and methods can use Quantum Monte Carlo (QMC) post-processing to correct for local bias in samples returned by a PQA. QMC is a method that can be used to obtain samples from a quantum Boltzmann distribution on a classical computer.

QMC post-processing can include taking the final samples $x_a$, a=1 ... N from the PQA, and initializing MCMC chains with those samples $x_a^{(0)}$. Here x denotes a quantum state that is represented, for example, as a path configuration of Path Integral QMC. MCMC chains can be evolved using a QMC transition operator corresponding to the distribution of interest $T_{\theta(\bar{t})}(x^{(i)}, x^{(i+1)})$. The transition operator can satisfy the following detailed balance condition:

$$p_{\theta(\bar{t})}^{QB}(x^{(i)}) T_{\theta(\bar{t})}(x^{(i)}, x^{(i+1)}) = p_{\theta(\bar{t})}^{QB}(x^{(i+1)}) T_{\theta(\bar{t})}(x^{(i+1)}, x^{(i)}).$$

Running a QMC chain for long enough can yield samples from distribution $p_{\theta(\bar{t})}^{QB}$. The minimum time needed to obtain such samples starting from random states $x_a^{(0)}$ can be referred to as an equilibration time. Starting the MCMC chains with PQA samples can reduce the equilibration time. One reason can be that the global features of the distribution $p_{\theta(\bar{t})}^{QB}$ are captured more correctly by PQA samples (which can provide relative probabilities of subspaces of the quantum state space).

To convert samples $x_a$ into equilibrium samples from $p_{\theta(\bar{t})}^{QB}$, it can be sufficient to equilibrate locally (i.e., within subspaces). Local equilibration can be faster, and can be considered as a post-processing technique. As a result, applying QMC post-processing with M steps can produce good-quality samples $x_a^{(M)}$ from quantum Boltzmann distribution $p_{\theta(\bar{t})}^{QB}$ for relatively small M.

In general, freeze-out point t is unknown. One approach is to choose a freeze-out point, and halt the annealing for a determined time at the freeze-out point, before re-starting the annealing. This approach is referred to as "annealing with pause" or "mid-anneal pause", and is described in International PCT Patent Application Publication No. WO2017075246A1 and U.S. Patent Application Ser. No. 62/331,288 entitled "SYSTEMS AND METHODS FOR DEGENERACY MITIGATION IN A QUANTUM PROCESSOR".

Another approach to determining $\bar{t}$ is to compute certain statistics of a quantum Boltzmann distribution $p_{\theta(\bar{t})}^{QB}$ for various points t∈[0,1], and define $\bar{t}$ as the point where these statistics are closest to the ones computed from samples obtained from a physical quantum annealer, and post-processed as described above. Such statistics can include spin and spin-spin expectations, average energy, variance of energy, and other suitable statistics. There can be several points where the statistics are close, and these points correspond to multiple freeze-out points. In one implementation, the first of these points is selected as $\bar{t}$.

Annealed Importance Sampling to Convert Samples from a Quantum Boltzmann Distribution to another Boltzmann Distribution The presently disclosed systems and methods include the use of annealed importance sampling to convert samples from good-quality samples of $p_{\theta(\bar{t})}^{QB}$ to samples from another quantum Boltzmann distribution $p_{\theta'}^{QB}$.

A sequence of intermediate quantum Boltzmann distributions can be generated as follows:

$$p_{\theta_k}^{QB}, k = 1 \ldots L, \theta_1 = \theta(\bar{t}), \theta_L = \theta'$$

so that distributions in every pair of consecutive distributions in the above sequence are sufficiently close to one another. Sufficiently close means that importance sampling of a first distribution from a pair of consecutive distributions in the above sequence can be performed efficiently using samples from a second distribution from the pair of consecutive distributions. One approach to selecting parameters $\theta_k$ is to linearly interpolate between $\theta(\bar{t})$ and $\theta'$, and choose L to be large enough that the distributions are sufficiently close.

A sequence of states $\vec{x} = (x^1, x^2 \ldots x^L)$ can be sampled from intermediate distributions $$p_{\theta_{t_k}}$$

with a probability as follows:

$$P(x^1, x^2, \ldots, x^L) = T_{\theta_{t_L}}(x^L, x^{L-1}) \ldots T_{\theta_{t_3}}(x^3, x^2) T_{\theta_{t_2}}(x^2, x^1) p_{\theta_{t_1}}(x^1).$$

A weight can be assigned to each sample as follows:

$$w(x^1, x^2, \ldots, x^L) = \frac{\tilde{p}_{\theta_{t_2}}(x^1)}{\tilde{p}_{\theta_{t_1}}(x^1)} \frac{\tilde{p}_{\theta_{t_3}}(x^2)}{\tilde{p}_{\theta_{t_2}}(x^2)} \cdots \frac{\tilde{p}_{\theta_{t_L}}(x^{L-1})}{\tilde{p}_{\theta_{t_{L-1}}}(x^{L-1})}$$

where $$\tilde{p}_{\theta_{t_k}}$$

is an unnormalized probability.

The samples $x^L$ can be used to compute an expected value of a function F(x) as follows:

$$\langle F(x) \rangle_{x \sim p_{\theta_j}} = \frac{\sum_{\vec{x} \sim P(\vec{x})} w(\vec{x}) F(x^L)}{\sum_{\vec{x} \sim P(\vec{x})} w(\vec{x})}$$

Efficiency of the approach can be characterized by the number of effective samples, as follows:

$$N_{eff} = \frac{\left(\sum_{\vec{x} \sim P(\vec{x})} w(\vec{x})\right)^2}{\sum_{\vec{x} \sim P(\vec{x})} w(\vec{x})^2}$$

If distributions $p_{\theta(\bar{t})}^{QB}$ and $p_{\theta'}^{QB}$ are sufficiently different from one other, the number of effective samples Neff can be small enough that the estimator for F(x) has a relatively high variance. Increasing the number of intermediate distributions L can increase the number of effective samples Neff, and reduce the variance of the estimator for F(x).

Training Quantum Boltzmann Machines and Restricted Boltzmann Machines

Figure 3:
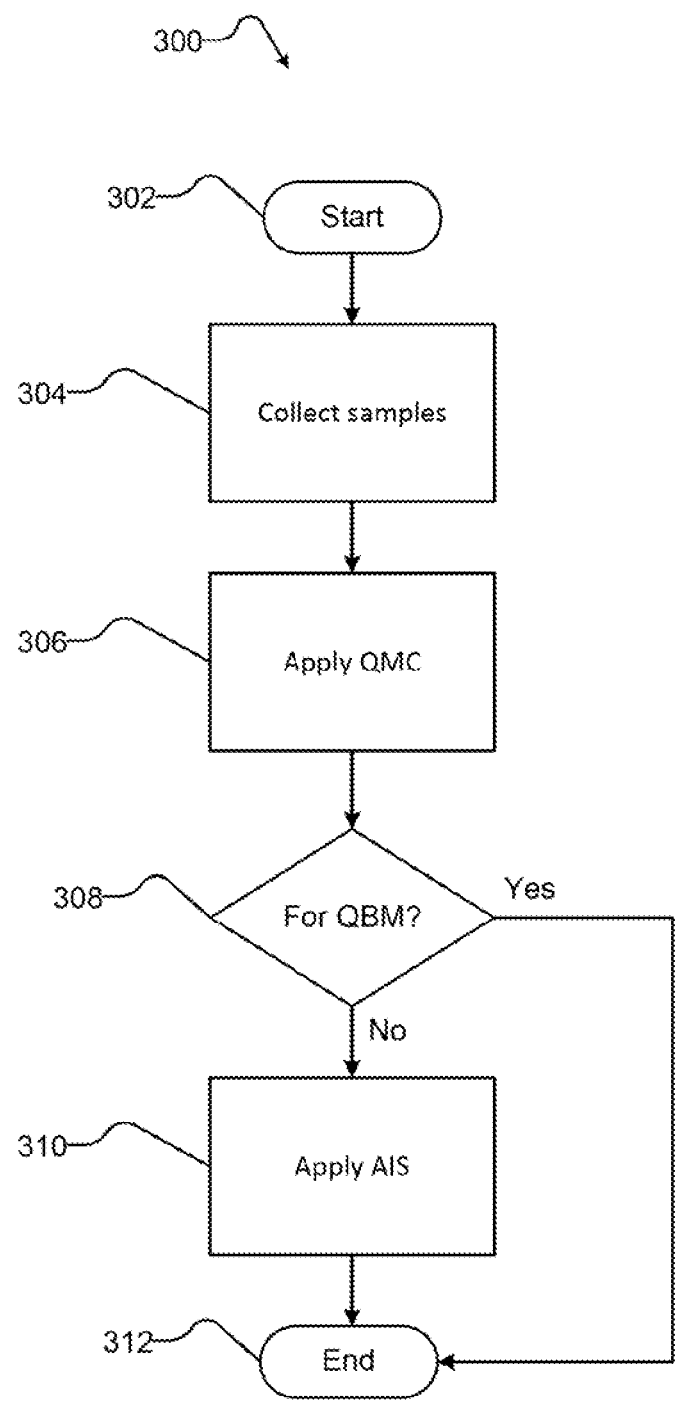
FIG. 3 is a flow-diagram that illustrates a method for post-processing samples from a physical quantum annealer, in accordance with the present systems, devices, articles, and methods.

FIG. 3 is a flow-diagram that illustrates a method 300 for post-processing samples from a physical quantum annealer, in accordance with the present systems, devices, articles, and methods. One or more of the acts in method 300 may be performed by or via one or more circuits, for instance one or more hardware processors. In some examples, a device including a hybrid computer (such hybrid computer 100 of FIG. 1) performs the acts in method 300.

Method 300 starts at 302, for example in response to an invocation by an invoking program, procedure, routine or function.

At 304, a computational system (e.g., hybrid computer 100 of FIG. 1) collects samples from a physical quantum annealer (PQA). At 306, the computational system applies QMC post-processing to the collected samples.

If, at 308, the computational system determines the post-processed samples are not for input to a Quantum Boltzmann Machine, method 300 proceeds to 310. At 310, the computational system applies annealed importance sampling (AIS) post-processing to the post-processed samples output from the QMC. At 312, method 300 ends.

If, at 308, the computational system determines the post-processed samples are for input to a Quantum Boltzmann Machine, method 300 proceeds to the end at 312.

FIG. 4A is a graph 400a of an evolution of an analog processor over time. An analog processor may be a quantum processor comprising superconducting qubits and couplers.

Vertical axis 402 represents the normalized evolution coefficient s and the horizontal axis 404 represent the time of the evolution of the analog processor. The normalized evolution coefficient s may represent the normalized flux applied to a compound Josephson junction or the normalized persistent current $I_P$ of a flux qubit. The normalized evolution coefficient s changes monotonically over time, increasing from 0 to a maximum value of 1.

The normalized evolution coefficient can also be referred to as the anneal fraction. The normalized evolution coefficient (or anneal fraction) is a parameter that can vary with time between 0 and 1, and can be used to define an annealing schedule.

A person skilled in the art will understand that the rate of change of the normalized evolution coefficient s over time is shown in FIG. 4A for illustration purposes only and in other implementations the normalized evolution coefficient can increase at a slower or faster rate. In some implementations the normalized evolution coefficient s can change non-linearly. Examples of evolution schedules of analog processors are described in Patent Publication No. US 2015/0363708.

Techniques described herein are used to operate a hybrid processor comprising an analog processor and a digital processor where the normalized evolution coefficient s may increase and/or decrease over the course of the operation of the hybrid processor. For certain operations, it may be desirable to operate the hybrid processor such that the analog processor reaches a predetermined classical spin state at the end of a first or initial evolution. This technique may allow study of problem dynamics, or it may be used for obtaining samples from the analog processor.

FIG. 4B is a graph of an example evolution 400b of an analog processor over time, operating with a digital processor to form a hybrid processor according to the present systems, methods and apparatus. An analog processor may comprise a quantum processor. Vertical axis 402 represents the normalized evolution coefficient s and the horizontal axis 404 the time of the evolution of the analog processor.

Before the start of example evolution 400b, the hybrid processor may determine a classical spin state and apply one or more preparatory biases to the analog processor to target the evolution of the analog processor towards the classical spin state. Preparatory biases may be applied via the analog processor's circuitry components, for example via on-chip DACs or analog lines. Preparatory biases may influence the evolution of the analog processor towards a classical state. When the analog processor is a quantum processor with n qubits, there are $2^n$ classical states.

In example evolution 400b the normalized evolution coefficient s increases from a value of 0 at time t=0 to a value of 1 at time $t_1$. A person skilled in the art will understand that the rate of the evolution from time t=0 to $t_1$ is shown in FIG. 4B for illustration purposes only and in other implementations the rate of the evolution of the analog processor from 0 to $t_1$ may be faster or slower than illustrated.

At $t_1$, the evolution is paused until time $t_2$. During the time interval between $t_1$ and $t_2$, shown in FIG. 4B as time interval 406, the digital processor may remove the preparatory biases applied before the start of example evolution 400b. A person skilled in the art will understand that time interval 406 can be dependent, at least in part, on the particular hardware and configuration of the analog processor, and the digital processor comprising the hybrid processor. The time taken by the digital processor to reprogram the analog processor and remove the applied preparatory biases may be different than shown in FIG. 4B. In some implementations, time interval 406 may range, for example, from 100 us to 200 μs. When the analog processor is a quantum processor, the digital processor may pause the evolution and retain the target classical spin state by keeping the energy barrier of the qubits high.

Additionally or in alternative, the hybrid processor may pause the evolution of the analog processor for a time interval longer than needed to reprogram the analog processor, thereby performing other operations, such as readout or post-processing, during time interval 406.

After time interval 406, the evolution of the analog processor resumes in a direction opposite the direction before time interval 406, i.e. backwards (also referred to in the present application as in a reverse direction). During this phase, the normalized evolution coefficient s decreases from 1 to a value s* at time $t_3$. The digital processor may determine the value of s* before the start of example evolution 400b, or during time interval 406.

Where the analog processor is a quantum processor, after time interval 406, the energy barriers of the qubits are lowered until an intermediate transverse field and/or tunneling energy is reached. The intermediate transverse field and/or tunneling energy may be determined by the digital processor.

After time $t_3$, the evolution of the analog processor is paused for a time interval 408 (between times $t_3$ and $t_4$). Time interval 408 may be determined by the digital processor, either before the start of example evolution 400b or during time interval 406. In some implementations, time interval 408 may, for example, range from 1 us to several milliseconds.

A person skilled in the art will understand that the rate of change of the normalized evolution coefficient s between time $t_2$ and time $t_3$ may be the same as the rate of change between 0 and time $t_1$, or may be different. The digital processor may, for example, determine the rate of change of the normalized evolution coefficient.

After time interval 408, the evolution of the analog processor resumes in the same direction as the evolution from 0 to time $t_1$, i.e. the normalized evolution coefficient s increases from value s* to 1 until the analog processor reaches a classical spin state at time $t_5$. Where the analog processor is a quantum processor, the digital processor may raise the energy barriers of the qubits to reach a classical spin state. The classical spin state reached at time $t_5$ may not be the same as the classical spin state reached at time $t_1$, given that the preparatory biases have been removed at time interval 406.

After time $t_5$, the digital processor may read out the classical spin state reached at $t_5$, and may perform post-processing.

In an alternative implementation, the hybrid processor performs post-processing on the obtained classical spin states at time interval 406 using classical methods. Therefore, the evolution of the analog processor is paused for a length of time necessary for the digital processor to perform the post-processing operations. An example of a classical post-processing method is Houdayer cluster moves, performed a predetermined number of times. Other classical post-processing methods can be used.

Alternatively, or in addition, post-processing may be used to improve samples obtained by the analog processor at time $t_1$. In an effort to improve the diversity of the samples obtained from the analog processor, the samples obtained at $t_1$ can be post processed as described above and used as feedback to run the evolution of the analog processor one or more times. During the time interval 406, after the digital processor has completed the post-processing operation, the digital processor can apply preparatory biases to the analog processor using the post-processed samples as input to influence the evolution of the analog processor towards obtaining a more diverse set of samples (e.g., obtaining samples from regions in the energy landscape that had not been previously explored by the analog processor). At time $t_2$, the evolution of the processor resumes backwards (i.e., in reverse) as described above until the normalized evolution coefficient reaches value s* at $t_3$. As noted above, the samples obtained at $t_5$ may not be the same as the samples obtained at $t_1$ or the post-processed samples at $t_1$. After time t, the digital processor may read out the samples obtained by the analog processor.

Figure 5:
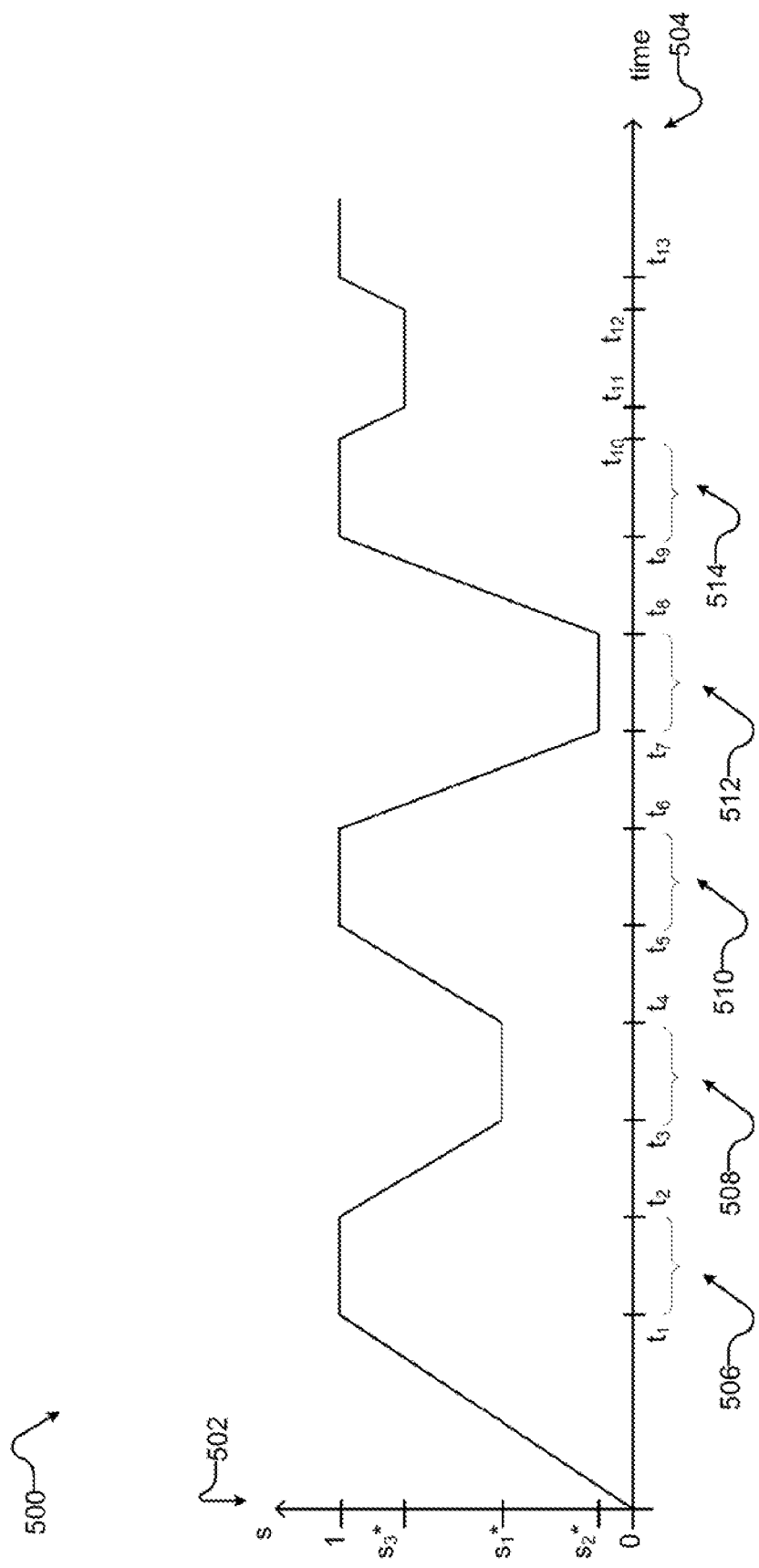
FIG. 5 is a graph of an exemplary evolution of an analog processor where the analog processor evolves backwards and forwards over time during the course of an annealing schedule.

FIG. 5 is a graph 500 of an example evolution 500 of an analog processor operating with a digital processor to form a hybrid processor according to the present systems, methods and apparatus, where the analog processor evolves backwards and forwards over time in the course of an annealing schedule. (Backwards evolution is also referred to as reverse annealing in the present application.) An analog processor may be a quantum processor comprising superconducting qubits and couplers. Vertical axis 502 represents the normalized evolution coefficient s* and the horizontal axis 504 represents the time of the evolution of the analog processor.

Before the start of example evolution 500, the digital processor may determine a set of normalized evolution coefficients as follows:

$$s^* = \{s_1^*, s_2^*, s_3^*, \ldots, s_n^*\}$$

Example evolution 500 resembles example evolution 400b until time $t_5$, which is described above.

After time $t_5$, the digital processor may read out the state of the analog processor and/or perform post-processing. At time $t_6$, the evolution of the analog processor resumes, and the normalized evolution coefficient s decreases from 1 to value $s_2^*$ at time $t_7$. Time interval 510 is a time interval between $t_5$ and $t_6$.

The value of $s_2^*$ may be different from the value of $s_1^*$ and, similarly, the rate of change of the normalized evolution coefficient s between $t_6$ and $t_7$ may be different from the rate of change of the normalized evolution coefficient s at other times during example evolution 500.

After a time interval 512, the evolution of the analog processor continues until the analog processor reaches a classical spin state at time t, and the normalized evolution coefficient s reaches a value of 1. As noted before with respect to example evolution 400b, the classical spin state reached at to may not be the same as the classical spin state reached at $t_1$ and/or $t_5$.

After time $t_9$, the evolution of the analog processor is paused for a time interval 514, where time interval 514 may be determined by the digital processor. During time interval 514 the digital processor may read out the state of the analog processor and/or perform post processing.

After time $t_{10}$, the evolution of the analog processor resumes in a similar pattern, evolving to a predetermined value of the normalized evolution coefficient s, pausing for a time interval, and resuming until the analog processor reaches a classical spin state, at times $t_{11}$, $t_{12}$, and $t_{13}$, respectively.

Example evolution 500 may be used to study a particular problem dynamic, or to generate sample from the analog processor.

Figure 6:
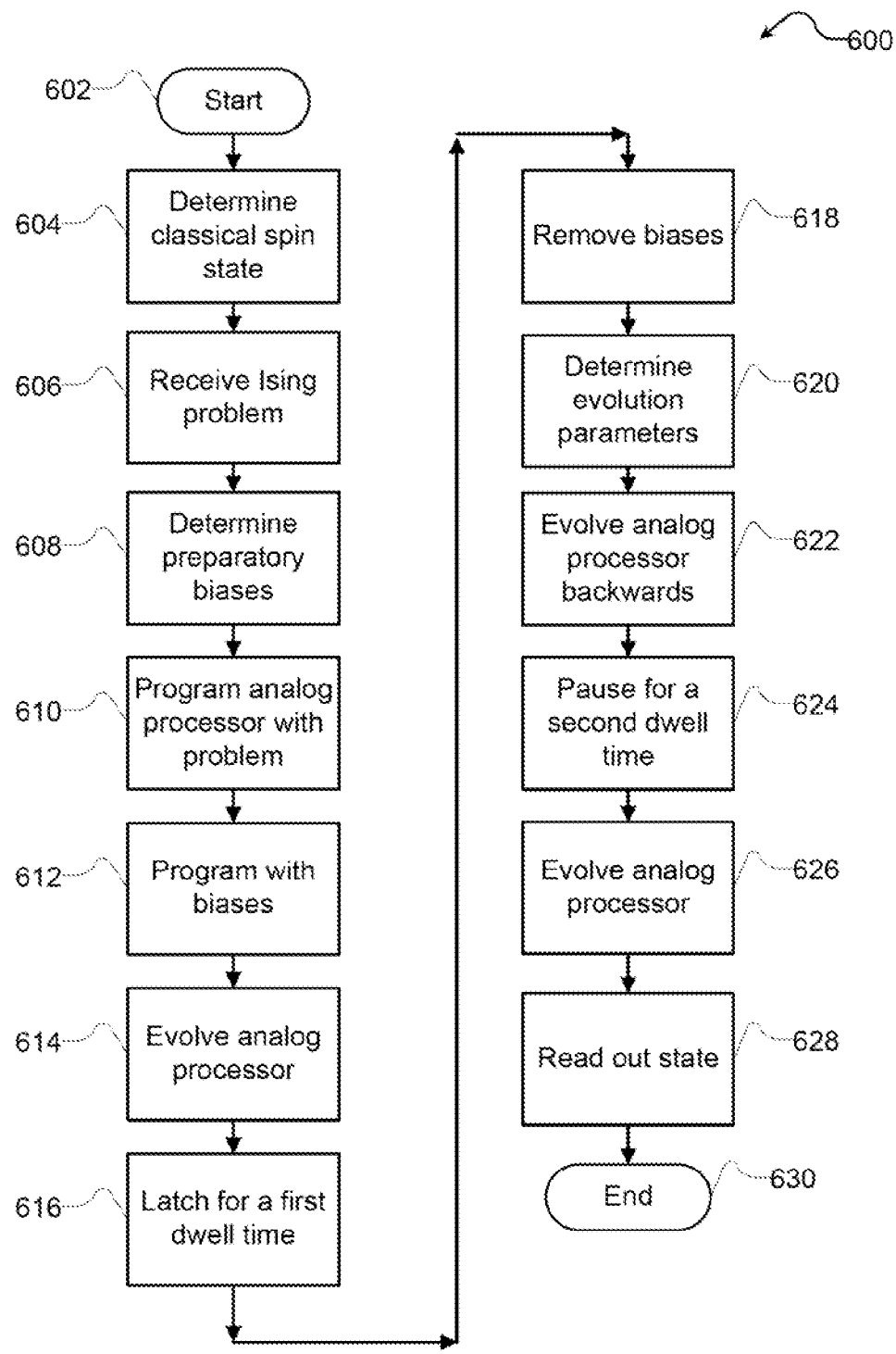
FIG. 6 is a flow diagram showing a computational method using a hybrid computing system for evolving an analog processor where the analog processor evolves backwards and forwards over time during the course of an annealing schedule.

FIG. 6 illustrates a flow diagram of a computational method 600 using a hybrid computing system for evolving an analog processor where the analog processor evolves backwards and forwards over time over the course of an annealing schedule. The hybrid computing system comprises a digital processor and a quantum processor.

Computational method 600 comprises acts 602 to 630; however, a person skilled in the art will understand that the number of acts is exemplary and, in some implementations, certain acts may be omitted, further acts may be added, and/or the order of the acts may be changed.

Computational method 600 starts at 602, for example in response to a call from another routine.

At 604, the digital processor determines a classical spin state for the analog processor. A classical spin state is a set of spin configurations as follows:

$$S_i = \{-1, +1\}$$

Computational method 600 will initially evolve the analog processor towards this classical spin state.

At 606, the digital processor receives an Ising problem to be solved via the analog processor. Such an Ising problem may be, for example, an optimization problem or a sampling problem.

At 608, the digital processor determines a set of preparatory biases that need to be applied to the elements of the analog processor so that the analog processor will evolve towards the classical spin state determined at 604. Where the analog processor is a quantum processor, the preparatory biases may be the flux biases applied to some or all of the qubits in the quantum processor. Preparatory biases can influence the evolution of the quantum processor towards the classical spin state determined at 604 so that the classical spin state is achieved with high fidelity (i.e., the probability of achieving the classical spin state is close to unity e.g. 0.9999).

At 610, the digital processor programs the analog processor with the Ising problem received at 606. The digital processor will program the h and/values of the Ising problem. Where the analog processor is a quantum processor, the digital processor will apply h and/values to the qubits and couplers of the quantum processor.

At 612, the digital processor programs the analog processor with the preparatory biases determined at 608. Where the analog processor is a quantum processor, the digital processor may load one or more pulses to the most significant digit of the qubits' flux bias DACs, in addition to the Ising problem bias term h. For example, two or three steps of the most significant digit of the qubits' flux bias DACs may be applied, so that qubits can be biased in the desired direction corresponding to the classical spin state determined at 604.

At 614, the analog processor evolves towards the classical spin state determined at 604. The rate of evolution at 614 may not be constant so that the evolution may be non-linear, e.g., ramping up at a certain stage or pausing before resuming towards the classical spin state.

At 616, the digital processor latches the state of analog processor for a first dwell time. Where the analog processor is a quantum processor, the qubits' energy barriers may be kept high for the first dwell time to retain the classical spin state. The digital processor may determine the first dwell time to be at least the time needed to reprogram the analog processor by removing the preparatory biases. In other implementations, the first dwell time may be longer.

At 618, the digital processor reprograms the analog processor to remove the preparatory biases, and the analog processor is programmed with the Ising problem received at 606. The time taken by this operation may depend on the particular configuration of the analog processor and the digital processor. Where the analog processor is a quantum processor, the digital processor can remove the one or more pulses to the most significant digit of the qubits' flux bias DACs that were applied at 612, leaving the bias term h of the Ising problem received at 606 such that the quantum processor is now programmed with the Ising problem only.

At 620, the digital processor determines evolution parameters including an intermediate tunneling energy and a second dwell time. The second dwell time can be independent from the analog processor programming time and may be different from the first dwell time.

At 622, the analog processor evolves in a backward direction until the intermediate tunneling energy is reached. Where the analog processor is a quantum processor, the qubits' energy barriers can be lowered to achieve the intermediate tunneling energy so that qubits in the quantum processor may not be in a classical spin state at 622.

In some implementations, one or more variables can be clamped in a classical spin state. Where the analog processor is a quantum processor, the clamped variables can each be represented by a respective one or more qubits, and the qubits representing the clamped variables can form a first subset of qubits of the quantum processor. At 622, the analog processor can evolve a second subset of qubits of the quantum processor, the second subset excluding qubits in the first subset of qubits (i.e., excluding qubits representing the clamped variables), in a backward direction until the intermediate tunneling energy is reached. The energy barriers of the second subset of qubits can be lowered to achieve the intermediate tunneling energy so that qubits in the second subset of qubits in the quantum processor may not be in a classical spin state at 622.

At 624, the digital processor pauses the analog processor for the second dwell time determined at 620. Where the analog processor is a quantum processor, the qubits' energy barriers may be kept at the intermediate tunneling energy level so that the evolution of the quantum processor is paused.

At 626, the analog processor evolves towards a classical spin state. Where the analog processor is a quantum processor, the digital processor raises the energy barrier of the qubits to evolve the quantum processor towards a classical spin state. The classical spin state reached at 626 may not be the same classical spin state reached at 614, owing to the removal of the preparatory biases at 618.

At 628, the digital processor reads out the state of the analog processor. During the read-out operation, the evolution of the analog processor is paused so that it maintains a classical spin state. Several methods may be employed for reading out the state of the analog processor, an example of a method and apparatus for reading out a state of a quantum processor are described in PCT Patent application PCT/US2016/031885.

At 630, computational method 600 ends, for example, until invoked again.

Figure 7:
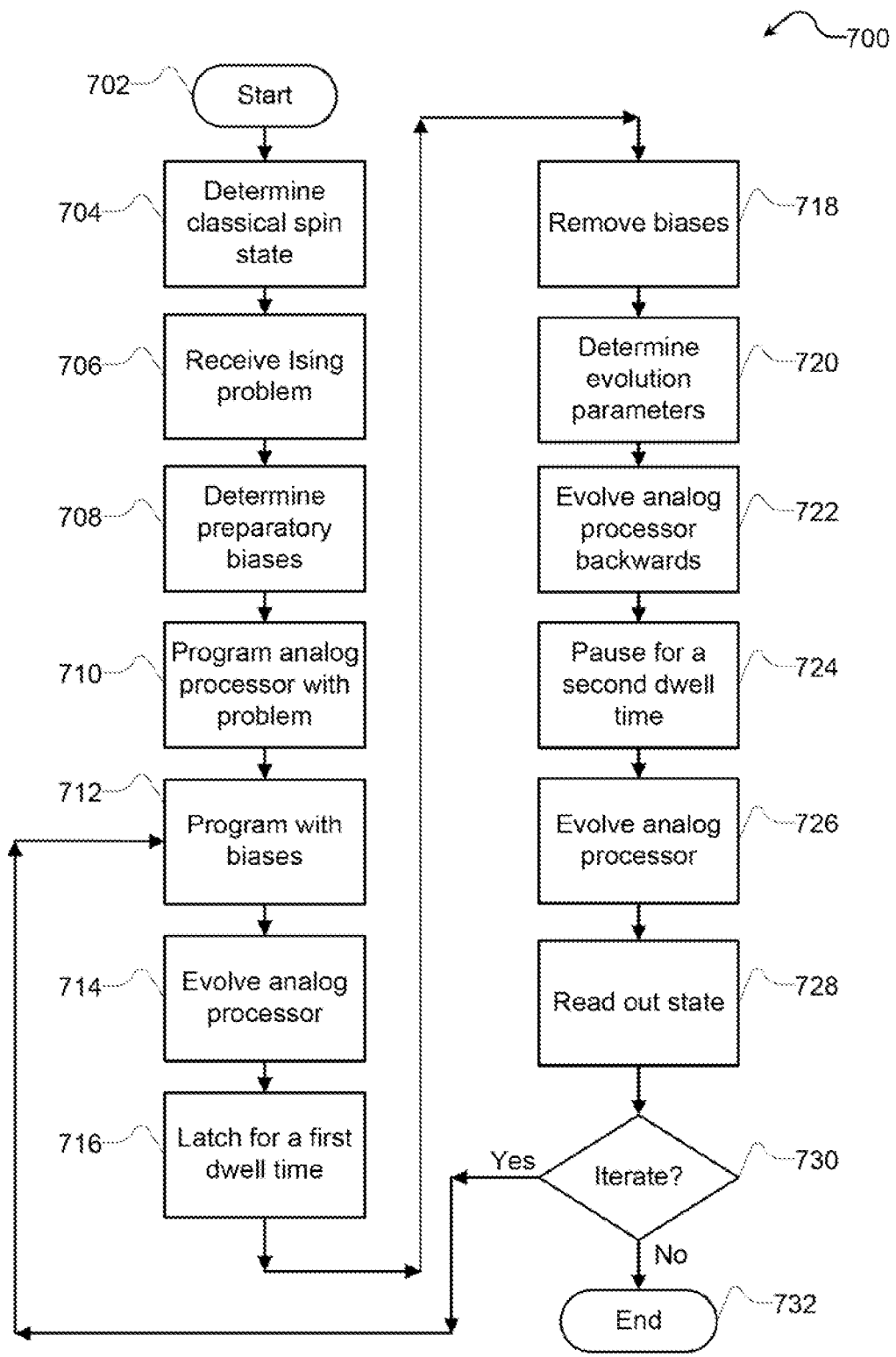
FIG. 7 is a flow diagram showing a computational method using a hybrid computing system for evolving an analog processor where the analog processor iterates evolving forwards and backwards over time during the course of an annealing schedule.

FIG. 7 shows a flow diagram of a computational method 700 using a hybrid computing system for evolving an analog processor over time, where the analog processor evolves backwards and forwards over the course of an annealing schedule. The hybrid computing system comprises a digital processor and a quantum processor.

Computational method 700 may be implemented as an extension of computational method 600 of FIG. 6 and comprises acts 702 to 732; however, a person skilled in the art will understand that the number of acts is exemplary and, in some implementations, certain acts may be omitted, further acts may be added, and/or the order of the acts may be changed.

Computational method 700 starts at 702, for example in response to a call from another routine.

At 704, the digital processor determines a classical spin state configuration, as described above with reference to 604 of computational method 600.

At 706, the digital processor receives an Ising problem to be solved by the analog processor, as described above with reference to 606 of computational method 600.

At 708, the digital processor determines a set of preparatory biases, as described above with reference to 608 of computational method 600.

At 710, the digital processor programs the analog processor with the Ising problem, as described above with reference to 610 of computational method 600.

At 712, the digital processor programs the analog processor with the preparatory biases, as described above with reference to 612 of computational method 600.

At 714, the analog processor evolves towards the classical spin state, as described above with reference to 614 of computational method 600.

At 716, the digital processor latches the state of analog processor for a first dwell time, as described above with reference to 616 of computational method 600.

At 718, the digital processor reprograms the analog processor to remove the preparatory biases, as described above with reference to 618 of computational method 600.

At 720, the digital processor determines evolution parameters including an intermediate tunneling energy and a second dwell time, as described above with reference to 620 of computational method 600.

At 722, the analog processor evolves in a backward direction until the intermediate tunneling energy is reached, as described above with reference to 622 of computational method 600.

At 724 the digital processor pauses the analog processor for second dwell time, as described above with reference to 624 of computational method 600.

At 726, the analog processor evolves towards a classical spin state, as described above with reference to 626 of computational method 600.

At 728, the digital processor reads out the state of the analog processor.

At 730, the digital processor determines whether to iterate based on an exit condition. In response to an exit condition not being met, control proceeds to 712, and the digital processor performs a further iteration of acts 712 to 728. At 712, the digital processor programs the analog processor with preparatory biases. In response to the exit condition being met, control proceeds to 732. An exit condition may comprise iterating for defined number of times.

At 732, computational method 700 terminates, for example, until invoked again.

Figure 8:
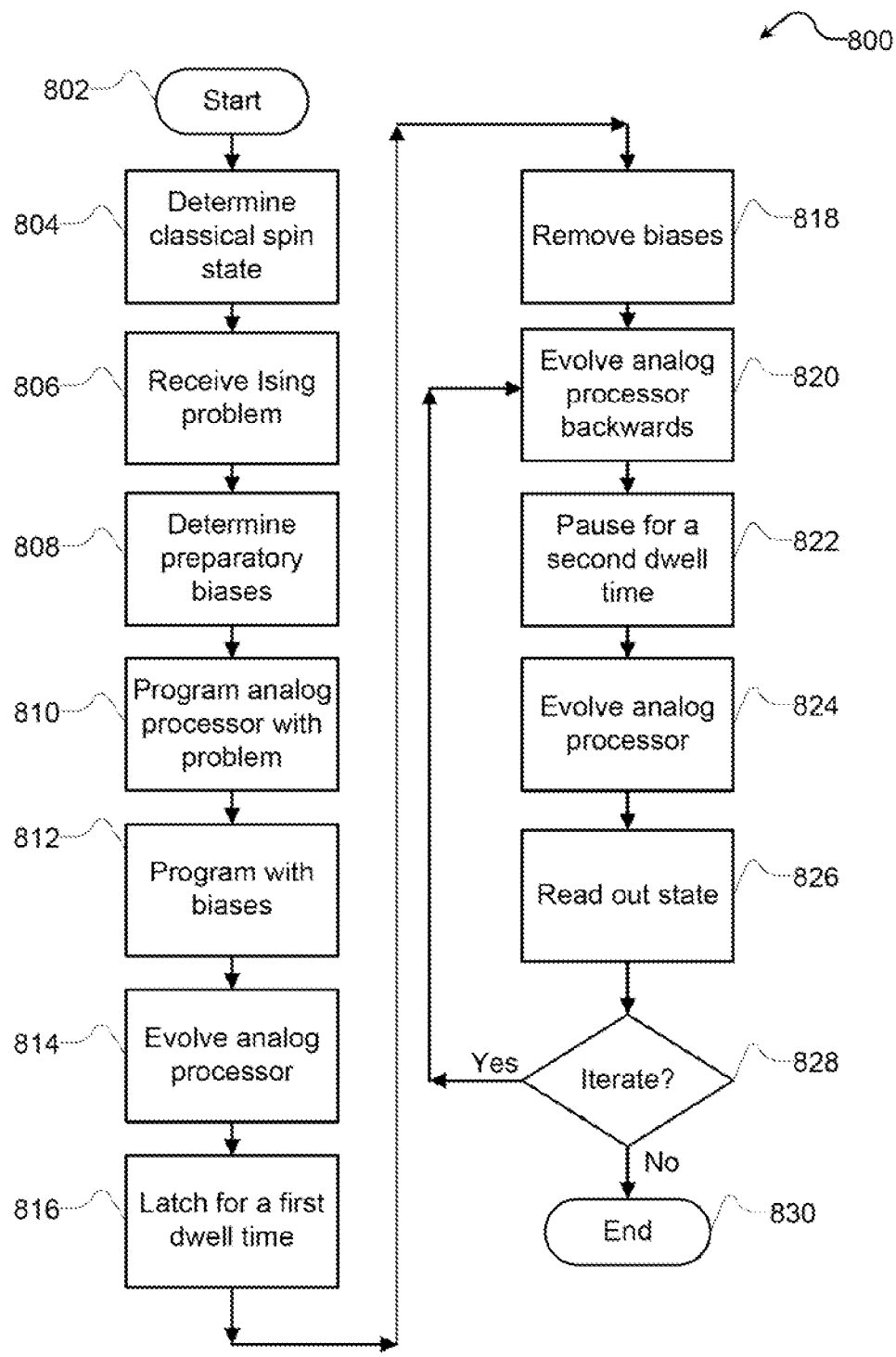
FIG. 8 is a flow diagram showing a computational method using a hybrid computing system for evolving an analog processor where the analog processor iterates evolving forwards and backwards over time during the course of an annealing schedule without been reprogrammed at each iteration.

FIG. 8 is a flow diagram of a computational method 800 using a hybrid computing system for evolving an analog processor over time, where the analog processor iterates forwards and backwards over the course of an annealing schedule and where the digital processor does not reprogram the analog processor at each iteration.

Computational method 800 comprises acts 802 to 830; however, a person skilled in the art will understand that the number of acts is exemplary and, in some implementations, certain acts may be omitted, further acts may be added, and/or the order of the acts may be changed.

Computational method 800 starts at 802, for example in response to a call from another routine.

At 804, the digital processor determines a classical spin state for the analog processor, as described above with reference to 604 of computational method 600 and/or 704 of computational method 700.

At 806, the digital processor receives an Ising problem to be solved by the analog processor. Such an Ising problem may be, for example, an optimization problem or a sampling problem. The digital processor also receives a set of normalized evolution coefficients:

$$s^* = \{s_1^*, s_2^*, s_3^*, \ldots, s_n^*\}$$

and a set of dwell times:

$$t^* = \{t_1^*, t_2^*, t_3^*, \ldots, t_n^*\}$$

At 808, the digital processor determines a set of preparatory biases, as described above with reference to 608 of computational method 600 and/or 708 of method 700.

At 810, the digital processor programs the analog processor with the Ising problem as described above with reference to 610 of computational method 600 and/or 710 of computational method 700.

At 812, the digital processor programs the analog processor with the preparatory biases as described above with reference to 612 of computational method 600 and/or 712 of computational method 700.

At 814, the analog processor evolves towards the classical spin state, as described above with reference to 614 of computational method 600 and/or 714 of computational method 800.

At 816, the digital processor latches the state of the analog processor for a first dwell time, as described above with reference to 616 of computational method 600 and/or 716 of computational method 700.

At 818, the digital processor reprograms the analog processor to remove the preparatory biases, as described above with reference to 618 of computational method 600 and/or 718 of method 700.

At 820, the analog processor evolves backwards until the normalized evolution coefficient s reaches value $s_1^*$, the first value of s in the set $s^*$ received by the digital processor at 806. Where the analog processor is a quantum processor, the energy barrier is lowered until the normalized evolution coefficient s reaches value $s_1^*$. When s has value $s_1^*$, qubits in the quantum processor may not be in a classical spin state.

At 822, the digital processor pauses the quantum processor for a dwell time $t_1^*$, where $t_1^*$ is the first value in the set of dwell times $t^*$ received by the digital processor at 806.

At 824, the analog processor evolves towards a classical spin state. Where the analog processor is a quantum processor, the digital processor raises the energy barrier of the qubits to evolve the quantum processor towards a classical spin state. The classical spin state reached at 824 may not be the same classical spin state reached at 814.

At 826, the digital processor reads out the state of the analog processor.

At 828, the digital processor determines whether to iterate based on an exit condition. In response to an exit condition not being met, control proceeds to 820, and the digital processor iterates through acts 820 to 826 of method 800. At 820, the analog processor evolves backwards until the next value $s^*$ is reached (e.g., if in the previous iteration the backward anneal was paused at $s_3^*$ in the current iteration the backward anneal will pause at $s_4^*$). Similarly, at 822, the digital processor latches the state of the analog processor for a dwell time corresponding to the next value of $t^*$ (e.g., if in the previous iteration the state of the analog computer was latched for dwell time $t_3^*$ in the current iteration the state of the analog computer will be latched for a dwell time $t_4^*$).

In response to the exit condition being met, control proceeds to 830. An exit condition may comprise iterating for defined number of times. For example, computational method 800 may iterate n times, where n is the size of the sets $s^*$ and $t^*$. At 830, computational method 800 terminates, for example, until invoked again.

Compared to computational method 700, the time taken to reprogram the processor with the Ising problem and the preparatory biases can be saved, or at least reduced, in computational method 800. Computational method 800 can have a faster execution cycle than that of computational method 700.

Computational methods 600, 700 and/or 800 may be used to operate a hybrid computer for studying problem dynamics, where an initial classical spin state is determined and a study of the escape rate out of the classical spin state at different points during an annealing schedule is desired. Alternatively, or additionally, computational methods 700 and/or 800 may be used for sampling. By repeating backward and forward annealing, the analog processor can explore neighborhoods close to the initial classical spin configuration. For example, computational methods 700 and/or 800 may be used for approximating Boltzmann sampling distributions.

Read out may be performed at each iteration of computational methods 700 and/or 800 (acts 726 and 826, respectively), or the state of the analog processor may be temporarily stored in a non-transitory memory storage device until the end of the iterations, and the digital processor may read out all the classical spin state at the end of computational methods 700 and/or 800, respectively. Where the analog processor is a quantum processor, a quantum flux parametron (QFP) shift register, with n QFPs per qubit, where n is the number of iterations of computational methods 700 and/or 800, may store all the classical spin states obtained during the execution of computational methods 700 and/or 800.

A person skilled in the may understand that the hybrid computing system may operate computational method 700 and 800 incrementally, wherein computational method 700 constitutes an outer loop and acts 820-826 of computational method 800 an inner loop.

Figure 9:
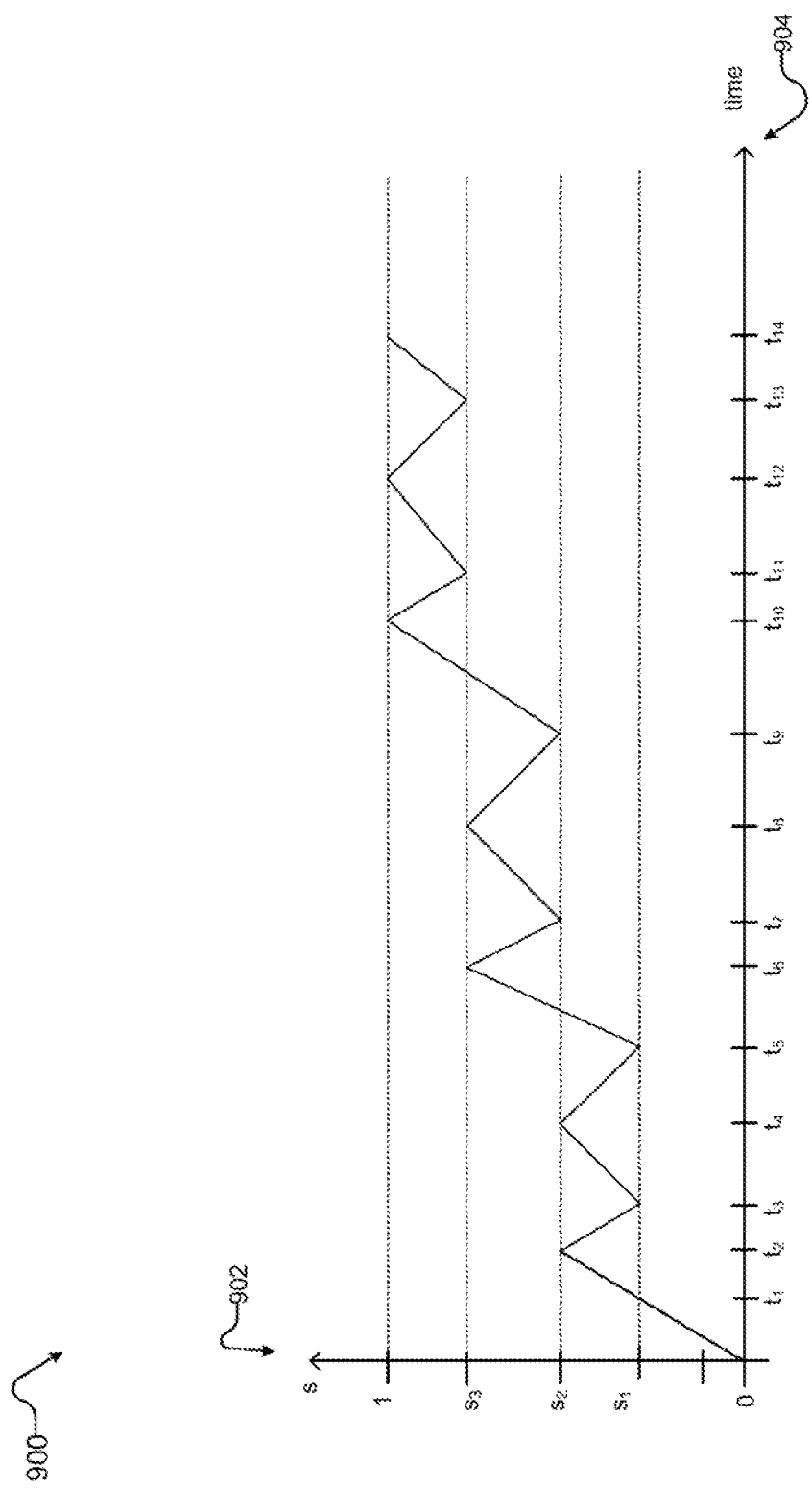
FIG. 9 is a graph of an exemplary evolution of an analog processor where the analog processor evolves backwards and forwards over intervals during the course of an annealing schedule.

FIG. 9 is a graph of an example evolution 900 of an analog processor, operating with a digital processor to form a hybrid processor according to the present systems, methods and apparatus, where the analog processor evolves forwards and backwards over several intervals. An analog processor may comprise a quantum processor. Vertical axis 902 represents the normalized evolution coefficient s and the horizontal axis 904 the time of the evolution of the analog processor.

Before the start of the evolution the digital processor may program a problem onto the analog processor. Where the analog processor is a quantum processor, the digital processor may, for example, assign bias and coupling strengths to some, or all, of the qubits and couplers of the quantum processor. The digital processor determines an annealing schedule for the analog processor (e.g., the digital processor may determine the rate of the anneal).

In example evolution 900, the normalized evolution coefficient s increases from 0 to a value $s_1$ in time $t_1$. A person skilled in the art will understand that the rate of the evolution from 0 to $t_1$ is shown in FIG. 9 for illustration purposes only and in other implementations the rate of the evolution of the analog processor from 0 to $s_1$ may be faster of slower than illustrated. In addition, where the analog processor is a quantum processor, some of the qubits in the quantum processor may have a different annealing rate than other qubits or they may start annealing at a later time.

At time $t_1$ the digital processor programs the analog processor with a first candidate annealing schedule. The first candidate annealing schedule may be the same as the initial annealing schedule determined by the digital processor before the start of the evolution.

At time $t_1$ the evolution of the analog processor may be paused for a time necessary to program the candidate annealing schedule (not shown in FIG. 9) or for other purposes, before resuming until the normalized evolution coefficient s reaches value $s_2$ at time $t_2$, where $s_2>s_1$. The values $s_1$ and $s_2$, and/or $t_1$ and $t_2$, may be determined by the digital processor before the start of the evolution and may be determined, at least in part, by the class of problem that is to be programmed into the analog processor.

At time $t_2$ the evolution of the analog processor proceeds in an opposite direction (i.e., backwards) with respect to the direction of the evolution up to time $t_2$. At time $t_3$ the normalized evolution coefficient s decreases to value $s_1$.

At time $t_3$ the digital processor programs the analog processor with a second candidate annealing schedule that may be different from the first candidate annealing schedule. The evolution of the analog processor may be paused for the time needed to program the second candidate annealing schedule into the analog processor.

After time $t_3$ the evolution of the analog processor proceeds in the first direction (i.e., forward) until a time ta when the normalized evolution coefficient s reaches value $s_2$ again, before proceeding in the opposite direction (i.e., backwards) until the normalized evolution coefficient reaches value $s_1$ at time $t_5$.

At times $t_2$ and $t_4$, the digital processor may readout the spin configurations of the analog processor.

While in FIG. 9 the evolution of the analog processor is shown to move forward and backwards between the values $s_1$ and $s_2$ two times, a person skilled in the art will understand that the analog processor may evolve between 1 and $s_2$ more than two times, or only once.

Similarly, the evolution of the analog processor proceeds forwards and backwards between $s_2$ and $s_3$, and successively between values of the normalized evolution coefficient $s_3$ and 1.

Although in FIG. 9 the evolution of the analog processor is shown to proceeds forwards and backwards between three values $s_1$-$s_3$ of the normalized evolution coefficient s, a person skilled in the art will understand that the evolution of the analog processor may proceed as described between less than three or more than three values of the normalized evolution coefficient s.

At time $t_{14}$, after intervening times $t_6$ through $t_{13}$, the analog processor can have tried a number of candidate annealing schedules between intervals of the normalized evolution coefficient s to attempt to find an optimal annealing schedule for each interval. Depending on the problem, or problem class, to be solved by the analog processor, a specific annealing schedule may be more suited than others to find, for example, a more diverse set of samples, a solution with a lower energy, or a solution that requires less post-processing.

Figure 10:
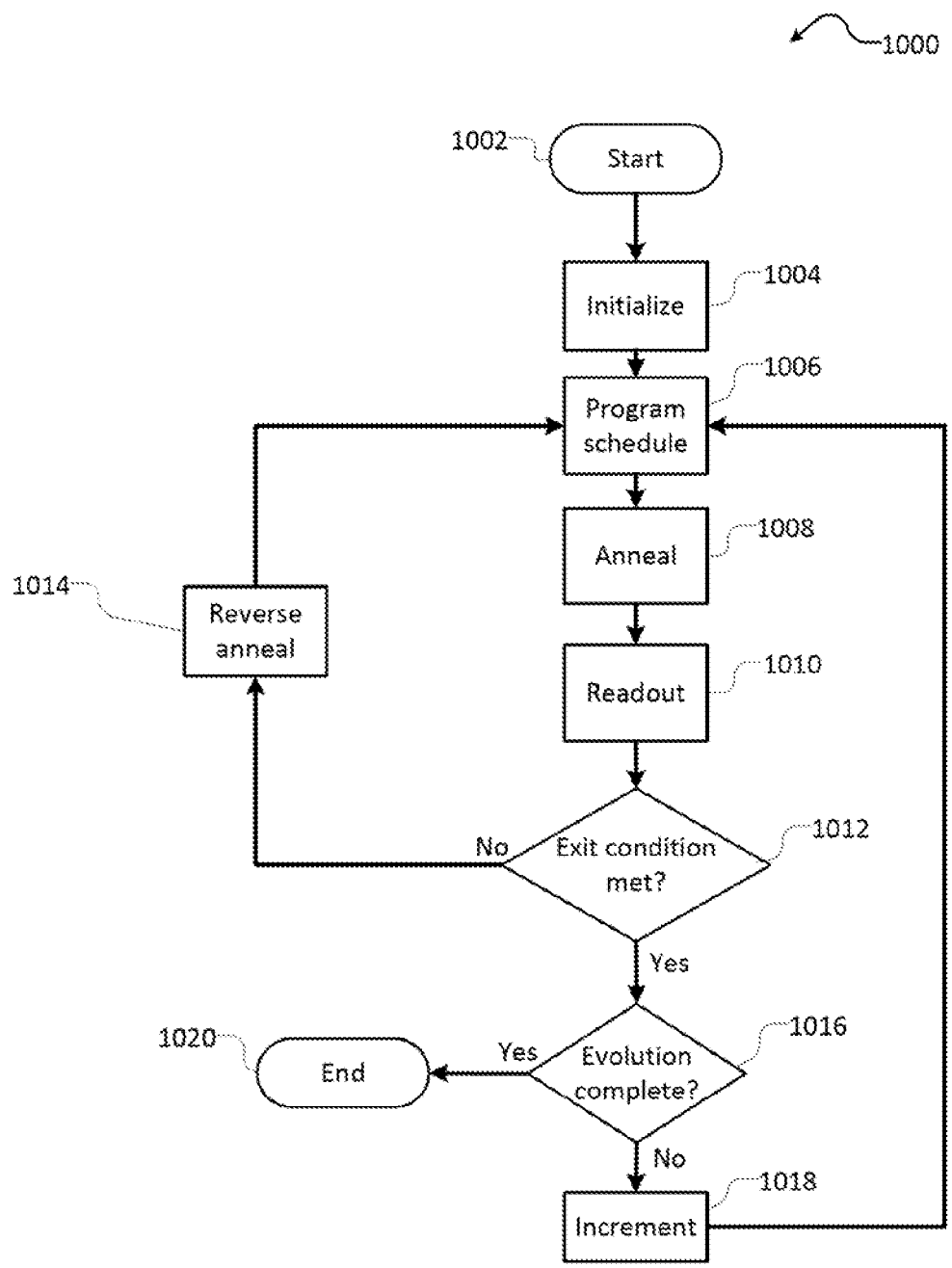
FIG. 10 is a flow diagram of a computational method using a hybrid computing system for evolving an analog processor where the analog processor evolves forwards and backwards over intervals during the course of an annealing schedule to discover a more suitable annealing schedule for each interval.

FIG. 10 is a flow diagram illustrating a computational method 1000 using a hybrid computing system for evolving an analog processor over time, where the analog processor evolves forwards and backwards over intervals of the normalized evolution coefficient s in an attempt to determine a more suitable annealing schedule for each interval.

Computational method 1000 comprises acts 1002 to 1020; however, a person skilled in the art will understand that the number of acts is exemplary and, in some implementations, certain acts may be omitted, further acts may be added, and/or the order of the acts may be changed.

Computational method 1000 starts at 1002, for example in response to a call from another routine.

At 1004 the digital processor initializes a counter i to an initial value i=0 and determines the number of intervals of the normalized evolution coefficient s for which method 1000 should run. The number of intervals can determine the value of the counter i. The digital processor may also determine a set of candidate annealing schedules for each interval of s. Alternatively, a set of candidate schedules may be determined by a separate process or routine, and passed to the digital processor as an input to computational method 1000, or the set of candidate schedules for each interval of i+1 can be determined after the candidate schedule for interval i has been computed in an iteration of computational method 1000.

At 1006 the digital processor programs the analog processor with one of the candidate annealing schedules for the interval [$s_i$, $s_{i+1}$].

At 1008 the analog processor starts an evolution in a first direction following the candidate annealing schedule programmed at 1006 until the normalized evolution coefficient reaches value $s_{i+1}$. Typically, the first direction is a forward direction (i.e. towards s=1).

At 1010 the digital processor reads out the state of the analog processor. The digital processor may store this information in a memory element for future calculation and/comparison. In some implementations, the analog processor may need to evolve until s=1 before the digital processor can read out the state of the analog processor. In evolving until s=1, the analog processor may evolve faster than to the evolution at 1008. In some cases, the analog processor may follow a ramp to s=1.

At 1012 the digital processor determines whether an exit condition has been met. In one implementation, the exit condition is completion of a defined number of iterations, the number of iterations corresponding to the number of candidate annealing schedules for the interval $[s_i, s_{i+1}]$. In this implementation, the exit condition ensures that the candidate annealing schedules have been tried. If the exit condition has been met, control passes to 1016, otherwise to 1014.

At 1014, evolution of the analog processor proceeds in the opposite direction (typically in the backwards or reverse direction i.e., away from s=1) until the normalized evolution coefficient decreases to value $s_i$ again. After 1014, control returns to 1006, where the digital processor programs the analog processor with a different one of the candidate schedules determined at 1004.

At 1016, the digital processor determines whether for the current value of the counter i the condition $s_{i+1}=1$ is met. If the condition is met, evolution of the analog processor has reached the end, and computational method 1000 has iterated over the previous intervals of s, and method 1000 proceeds to 1020. Computational method 1000 terminates at 1020, until it is invoked again, for example. Alternatively, before terminating execution of computational method 1000, the digital processor may determine a more suitable annealing schedule for each interval, based at least in part on the readout information collected at 1010, and program the analog processor to evolve according to the more suitable annealing schedule for each interval.

If the condition is not met, control passes to 1018. At 1018, the digital processor increments the value of the counter i to i+1, progressing execution of computational method 1000 to the next interval of s. Control then passes to 1006, where the digital processor programs the analog processor with one of the candidate annealing schedules for the interval $[s_i, s_{i+1}]$ determined at 1004.

An analog processor may solve a computational problem involving more than one variable. Where the analog processor is a quantum processor, the variables of the problems may be represented by qubits.

Depending on the problem and the topology of the quantum processor, one or more variables in the problem may be represented in the quantum processor by more than one qubit. For example, one variable may be represented by a group of two or more qubits that are influenced to behave as a single qubit by programmable couplers. Such groups of qubits are commonly referred to as chains. These chains are distinct from the QMC chains and MCMC chains described above. The qubits in a chain can take the same spin as each other at the end of the evolution of the quantum processor (either spin up or spin down).

The digital processor may assign a coupling strength to the programmable couplers so that the qubits in the chain behave as a single qubit. The stronger the chain, the more likely it is that the qubits in the chain can behave as a single qubit. The coupling strength, or chain strength, may vary over the evolution of the quantum processor. For example, the chain strength may be defined as a ratio of the coupling strength of qubits in the chain to the strongest logical graph coupling.

Figure 11:
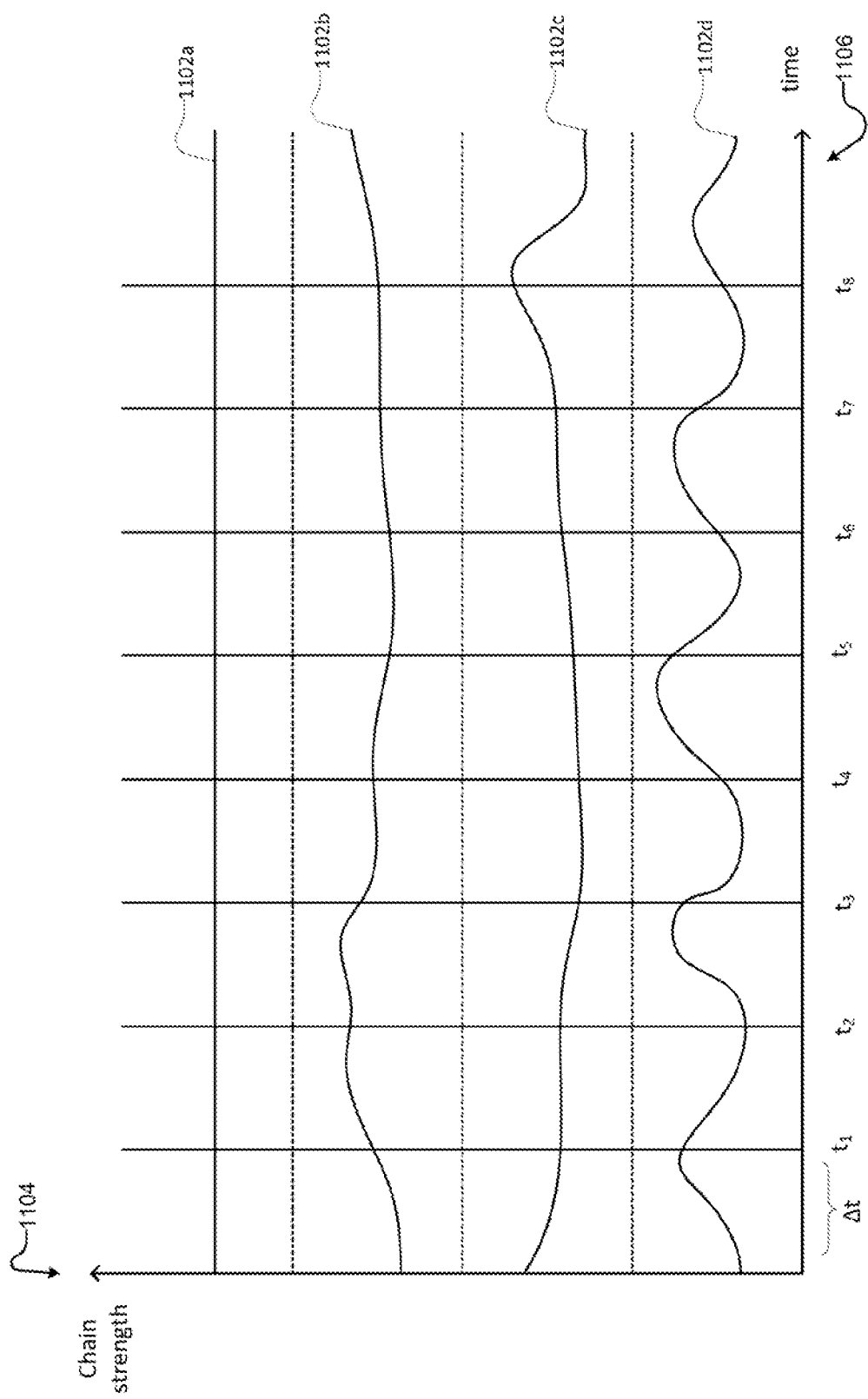
FIG. 11 is a graph of an exemplary variation of chain strength over the course of the evolution of a hybrid computing system.

FIG. 11 is a graph of an exemplary variation of chain strength over the course of an evolution of a hybrid computing system comprising a digital processor in communication with an analog processor. In particular, FIG. 11 shows an exemplary variation of chain strengths 1102*a*, 1102*b*, 1102*c*, and 1102*d* (collectively 1102) of four variables over the course of an evolution of an analog processor. The vertical axis 1104 represents the chain strengths of the four variables and the horizontal axis 1106 represents the time of the evolution of the analog processor. One or more variables may be represented in a quantum processor by more than one qubit, so that the chain strength of one variable may be the combination of the coupler strengths of the couplers connecting the qubits in the chain.

In FIG. 11, chain strength 1102*a* remains approximately constant over the course of the evolution of the analog processor, while chain strengths 1104*b*, 1104*c*, and 1104*d* vary. A person skilled in the art will understand that the analog processor may be representing a computational problem with more than four variables, or with less than four variables, and the chain strength of each variable may be approximately constant, or vary over the course of the evolution, or be approximately constant for a phase of the evolution and vary over another phase of the evolution.

The digital processor in the hybrid computing system programs the chain strength of each chain at the beginning of the evolution, thus setting the chain strength to an initial value. However, during the evolution, some of the chain strengths may vary, depending on, for example, external influence or noise in the analog processor. Therefore, the initial value of the chain strength may not be an optimal value, or a preferred value, for throughout the evolution.

To compensate for variation in chain strength, the digital processor may pause the evolution of the analog processor at predetermined times to read out the chain strength of the variables. In FIG. 11, the digital processor may read out the chain strength of the four variables at time intervals of $\Delta t$, at times $t_1$ to $t_8$.

While in FIG. 11 the digital processor reads out the values of the chain strengths at regular time intervals, a person skilled in the art will understand that in a different implementation, the digital processor may read out the values of the chain strengths at irregular (or unequal) intervals.

Figure 12:
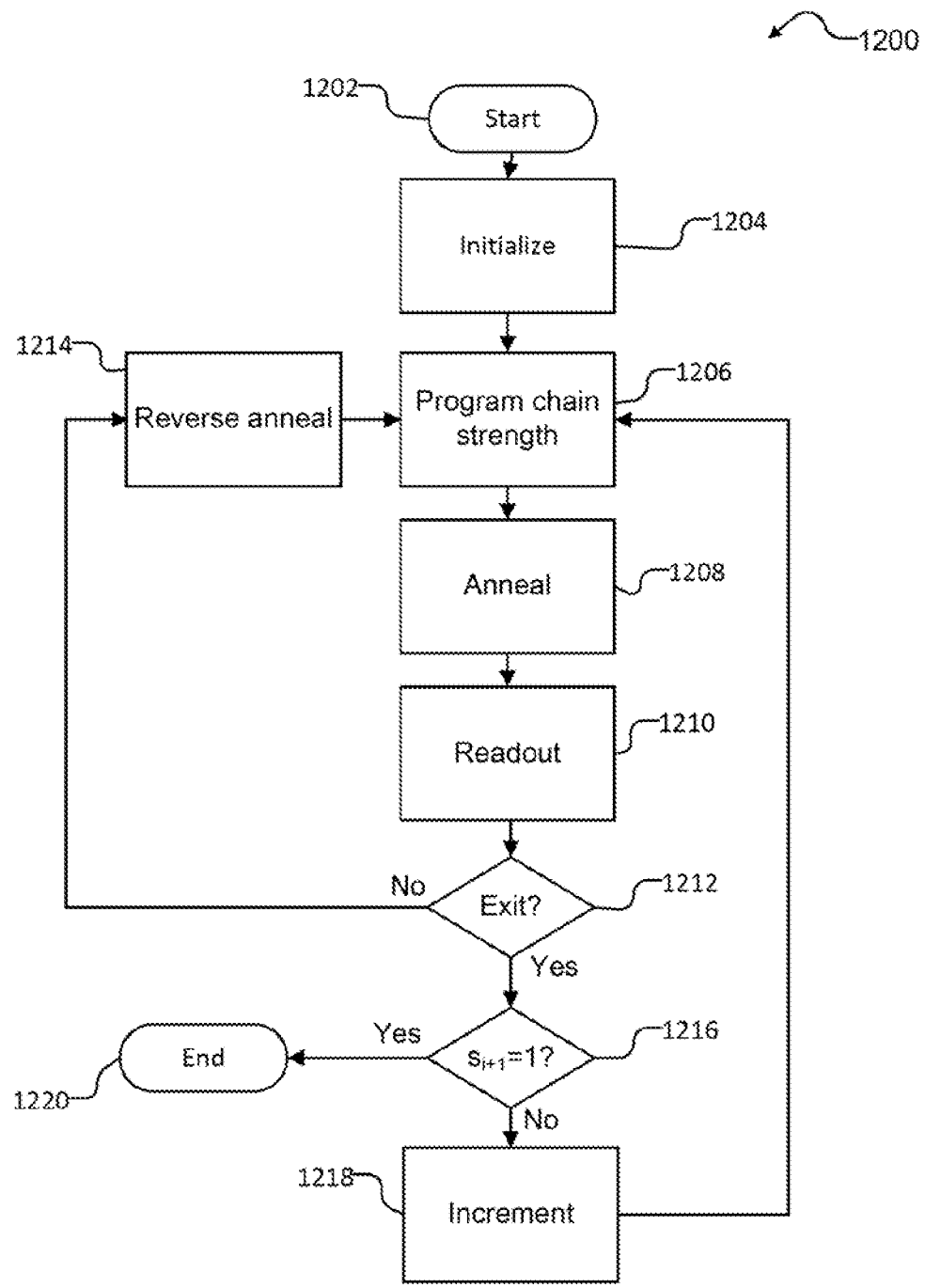
FIG. 12 is a flow diagram of a computational method using a hybrid computing system for evolving an analog processor where the chain strengths of the variables in the analog processor changes over the course of the evolution.

FIG. 12 is a flow diagram of a computational method 1200 using a hybrid computing system for evolving an analog processor where the chain strengths of the variables in the analog processor changes over the course of the evolution and where the digital processor determines a more optimal, or preferred, chain strength for each problem variable, and for each interval, based on reading out the chain strengths during the evolutions. The analog processor may be a quantum processor.

Computational method 1200 comprises acts 1202 to 1220; however, a person skilled in the art will understand that the number of acts is exemplary and, in some implementations, certain acts may be omitted, further acts may be added, and/or the order of the acts may be changed.

Computational method 1200 starts at 1202, for example in response to a call from another routine.

At 1204, the digital processor initializes a counter i to an initial value i=0. The digital processor determines a number of intervals of the normalized evolution coefficient s for which method 1200 should run. The number of intervals can determine the value of the counter i. At the same time, the digital processor may program other elements of the analog processor in order to prepare the analog processor for solving a computational problem. The digital processor also determines, based at least in part on the problem to be solved, a set of candidate chain strengths for each interval. Alternatively, the set of chain strengths may be determined by a separate routine, and passed as an input to computational method 1200, or the set of candidate chain strengths for each interval of i+1 can be determined after the candidate chain strengths for interval i have been computed via an iteration of computational method 1200.

The chain strength for each chain can depend, at least in part, on the problem to be solved by the analog processor and/or, in the case of a quantum processor, on the number of qubits comprising each variable and/or other characteristics of the quantum processor.

At 1206 the digital processor programs the analog processor with one of the candidate chain strengths from the set of candidate chain strengths. The digital processor may also program other parameters of the analog processor, as necessary.

At 1208, the evolution of the analog processor starts and continues until a value of the normalized evolution coefficient $s_{i+1}$.

At 1210, the digital processor reads out the values of the chain strengths of the variables represented by chains in the analog processor. At the same time, the digital processor may read out other values of other elements of the analog processor. To do so, the evolution of the analog processor may pause for a time necessary to carry out the readout operation. Additionally, or in alternative, the analog processor may evolve at a faster rate, or ramp up the evolution, until the normalized evolution coefficient reaches value 1 before carrying out the readout operation.

At 1212, the digital processor determines whether an exit condition has been met. If the exit condition has been met, control passes to 1216, otherwise control passes to 1214. An exit condition may be, for example, the execution of a number of iterations, where the number of iterations corresponds to the number of candidate chain strengths for each interval of the normalized evolution coefficient. An alternative exit condition may be reaching a threshold of a performance measure.

At 1214, the evolution of the analog processor proceeds in an opposite direction (i.e., in a backwards or reverse direction—the reverse evolution also referred to in the present application as a reverse anneal) until the value of the normalized evolution coefficient s decreases to $s_i$. Control then passes to 1206 where the digital processor programs the analog processor with another one of the candidate chain strengths from the set of candidate chain strengths. The digital processor may also program other parameters of the analog processor, as desired. Alternatively, or in addition, the digital processor may program the chain strengths based on a combination of another one of the candidate chain strengths and the readout at 1208.

At 1216, the digital processor determines whether the value $s_{i+1}=1$. In this case, all the analog processor will have tried all the candidate chain strengths for all the intervals of the normalized evolution coefficient i. Upon meeting the condition control passes to 1220, otherwise to 1218.

At 1218, the digital processor increases the value of the counter i to i+1, progressing the execution of computational method 1200 to the next interval of s. Control then passes to 1206, where the digital processor programs a candidate chain strength for the next interval of s.

At 1220, computational method 1200 terminates, until it is invoked again. Alternatively, before terminating execution of computational method 1200, the digital processor may determine a more suitable chain strength for each interval, based at least in part on the readout information collected at 1208, and program the analog processor to evolve according to the more suitable chain strength for each interval of s.

Figure 13:
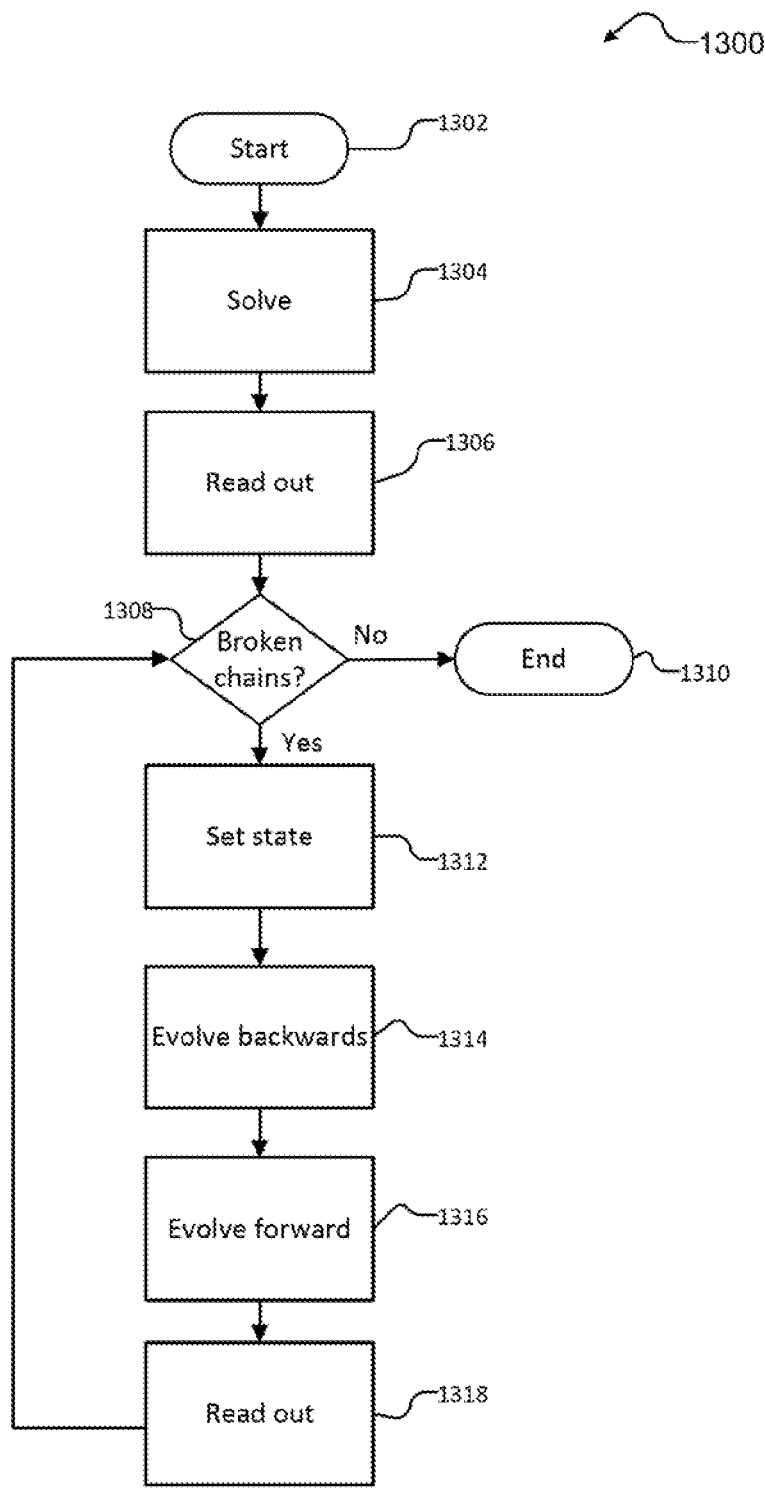
FIG. 13 is a flow diagram of a computational method using a hybrid computing system for evolving an analog processor, where the analog processor evolves backwards and forwards to mitigate the effect of broken chains.

FIG. 13 is a flow diagram of a computational method 1300 using a hybrid computing system for evolving an analog processor, where the analog processor evolves backwards and forwards to mitigate the effect of broken chains.

When a problem requires the use of chains to be programmed into the specific topology of the quantum processor, it may occur that at the end of the evolution of the quantum processor one or more chains contains qubits whose spin do not agree, e.g., some qubits in a single chain have spin up while other qubits in the same chains have spin down. In this case the chain is said to be broken.

Solutions containing broken chains may not be meaningful and may require post-processing. Additionally or in alternative, repeating solving the same problem with the quantum processor may help mitigate the effect of the broken chains.

Computational method 1300 attempts to mitigate the effect of broken chains in a solution by evolving only the broken chains in a quantum processor backwards and then evolving them forward.

Computational method 1300 comprises acts 1302 to 1318; however, a person skilled in the art will understand that the number of acts is exemplary and, in some implementations, certain acts may be omitted, further acts may be added, and/or the order of the acts may be changed.

Computational method 1300 starts at 1302, for example in response to a call from another routine.

At 1304, the analog processor solves a problem by evolving and reaching a solution. The digital processor may program the problem into the analog processor by programming the parameters of the analog processors, including chain strength.

At 1306, the digital processor reads out the state of the analog processor. Where the analog processor is a quantum processor, the digital processor reads out the spin configuration of the qubits.

At 1308, the digital processor determines if there are any broken chains in the solution read out at 1306. Where the analog processor is a quantum processor, the digital processor checks if the spin configurations of the qubits within a chain agree with one another. The digital processor can check one or more of the chains. If there are no broken chains in the solution read out at 1306, control passes to 1310, otherwise to 1312.

At 1312, the digital processor sets or programs the state of the analog processor so that unbroken chains are held fixed. Where the analog processor is a quantum processor, the digital processor can program the quantum processor by setting the spin configurations of qubits not belonging to a broken chain as fixed.

At 1314, the evolution of the analog processor proceeds backwards so that the value of the normalized evolution coefficient s decreases. Given that the state of the non-broken chains has been set at 1312, only a portion of the analog processor will evolve backwards. The digital processor will determine when to pause the backwards anneal of the analog processor, trying to pause it at a time when the chains were unbroken. In order to do so, the digital processor may have to read out the state of the analog processor one or more times at various points during the backwards (reverse) anneal.

At 1316, evolution of the analog processor proceeds forward, until the end of the evolution, when the normalized evolution coefficient s reaches a value of 1. Given that unbroken chains were held fixed at 1312, only the portion of the processor that had broken chains at 1308 is evolving forward.

At 1318, the digital processor reads out the state of the analog processor. After 1318, control passes back to 1308, where the digital processor determines if there are broken chains in the solution read out at 1318. Method 1300 iterates until there are no broken chains in the solution.

At 1310, computational method 1300 terminates, until, for example, it is invoked again.

Alternatively, computational method 1300 may be implemented without evolving the analog processor backwards. At 1314, the analog processor, instead of evolving backwards, may start a new evolution cycle for the broken chains only, where the unbroken chains are set fixed at 1312.

As described above, the digital processor can, at each iteration, check if there are broken chains in a solution obtained by the analog processor, and repeat evolving the broken chains until a result is produced with no broken chains. Alternatively, the digital processor may determine to stop the iterations based on the completion of a defined number of iterations.

Other methods exist for post-processing samples obtained with an analog processor. Some post processing techniques are described in US Patent Publication No US2015363708, U.S. Pat. Nos. 7,307,275, 8,244,650, 8,494,993 and US Patent Publication No 20160071021.

Some approaches to post-processing are classical, i.e., they use a digital processor to post-process samples from an analog processor. As described in the present application, other approaches use a hybrid computing system, the hybrid computing system comprising an analog processor and a digital processor, where the post-processing operation is performed on the analog processor.

Where the analog processor is a quantum processor that produces a sample s for a problem Hamiltonian (h,J), where h is a bias applied to the qubits and/is a coupling strength, embedded on the quantum processor hardware with Hamiltonian (h',J'), some of the chains on the sample s may be broken. Suppose that variables $b_1, \ldots, b_n$ have broken chains (i.e., not all the qubits in $b_i$ take the same spin) and the variables $a_1, \ldots, a_m$ do not have broken chains. The digital processor may construct a post-processing Hamiltonian $(h^{(s)}, J^{(s)})$ to be solved by the quantum processor as follows.

For the unbroken chain corresponding to variable at, spin $s(a_i)$ can be defined as the unique spin value obtained by the qubits in the chain. Given that $a_i$ represents an unbroken chain, qubits in $a_i$ can take the same spin value as each other at the end of an evolution cycle.

For each variable $b_i$, corresponding to broken chains, it is possible to define $b_i^+$ and $b_i^-$ as the set of qubits within $b_i$ with up and down spins, respectively.

Accordingly, it is possible to define $c_i^{(j)}$ as the connected components of the chain corresponding to bi. That is, each $c_i^{(j)}$ is the maximum subset of the chain corresponding to bi, such that every qubit in $c_i^{(j)}$ has the same spin and if there is a coupler between $c_i^{(j)}$ and $c_i^{(k)}$ then the spins in $c_i^{(j)}$ and $c_i^{(k)}$ have opposite value. Similarly, it is possible to define $s(c_i^{(j)})$ to be the unique spin taken by all the qubits in the connected component $c_i^{(j)}$.

The post processing Hamiltonian $(h^{(s)}, J^{(s)})$ is defined with variables v1, . . . vN corresponding to the connected components of broken chains $c_i^{(j)}$. The digital processor, after analyzing the sample s and determining that it contains broken chains, will program into the quantum processor qubit biases $h_x^{(s)}$ and interaction between variables $J_{xy}^{(s)}$ as follows.

The qubit biases $h_x^{(s)}$, where vx is the variable corresponding to the chain component $c_i^{(j)}$, are defined as $$h_x^{(s)} = \sum_{q \in c_i^{(j)}} h'_q + \sum_{k=1}^{m} \sum_{p \in a_i} \sum_{q \in c_i^{(j)}} J'_{pq} s(a_i)$$

In $h_x^{(s)}$ the qubit biases are collected along the chain component and the contribution from the unbroken chains are moved into the spin biases.

The two-term interactions between variables vx and vy, corresponding to chain components $c_i^{(j)}$ and $c_k^{(l)}$ are given by the problem interactions between two chain components in the embedded Hamiltonian (h',J'):

$$J'_{xy} = \sum_{p \in c_i^{(j)}} \sum_{p \in c_k^{(l)}} J'_p q$$

The broken chains can then be post-processed by the quantum processor via a post-processing Hamiltonian $(h^{(s)}, J^{(s)})$. The approach may be repeated for each of the samples s obtained by the quantum processor.

An implementation of the above described technique to produce a post-processing Hamiltonian is shown below:

```
input : embedding, h, J, embeddedh, embeddedJ, sample
output: sampleh, sampleJ
N ← 0:
for each variable v do
| if all qubits in embedding(v) have the same spin in sample then
| | s(v) ← sample(v)
| else
| | s(v) ← 0;
| | for each connected component c of embedding(v) do
| | | component(N) ← c: variable(N) ← v: N ← N + 1;
| | end
| end
end
for i ← 1, ..., N do
| sampleh(i) ← 0; for each qubit q in component(i) do
| | sampleh(i) ← sampleh(i) + embeddedh(q);
| | for each variable v do
| | | for each qubit p in embedding(v) do
| | | | sampleh(i) ← sampleh(i) + embeddedJ(p q)*sample(v);
| | | end
| | end
| end
| for j ← 1, ..., N, j ≠ i do
| | sampleJ(i j) ← 0;
| | for each qubit p in component(i) do
| | | for each qubit q in component(j) do
| | | | sampleJ(i j) ← sampleJ(i j) + embeddedJ(p q);
| | | end
| | end
| end
end
return sampleh, sampleJ
```

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. To the extent that they are not inconsistent with the specific teachings and definitions herein, all of the US patents, US patent application publications, US patent applications, referred to in this specification and/or listed in the Application Data Sheet, including U.S. Provisional Patent Application No. 62/347,421, filed Jun. 8, 2016; US Provisional Patent Application No. 62/364,169, filed Jul. 19, 2016; and U.S. Provisional Patent Application No. 62/417,940, filed Nov. 4, 2016 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to operate a hybrid computer comprising at least one digital processor communicatively coupled to a quantum processor, the method performed by the at least one digital processor and comprising:

receiving, by the at least one digital processor, a sample solution to a computational problem represented by a problem Hamiltonian embedded onto the quantum processor by an embedded Hamiltonian, wherein the sample solution to the computational problem comprises one or more broken chains;

defining, by the at least one digital processor, a post-processing Hamiltonian representing the computational problem, the post-processing Hamiltonian having chain component variables, each one of the chain component variables corresponding to a respective set of connected qubits in one of the one or more broken chains that have a same spin direction, wherein a qubit bias of each of the chain component variables in the post-processing Hamiltonian is at least partially based on qubit biases of the embedded Hamiltonian of a respective set of connected qubits;

embedding, by the at least one digital processor, the post-processing Hamiltonian onto the quantum processor; and, causing, by the at least one digital processor, the quantum processor to evolve based on the post-processing Hamiltonian to a state representative of the sample solution to the computational problem represented by the problem Hamiltonian in which the one or more broken chains are repaired.

2. The method of claim 1, wherein the sample solution to the computational problem includes one or more intact chains, and the defining, by the at least one digital processor, a post-processing Hamiltonian further comprises: determining the qubit bias of each of the chain component variables through collection of qubit biases of the embedded Hamiltonian along a respective set of connected qubits in one of the one or more broken chains and determination of a spin bias contributed by one of the one or more intact chains.

3. The method of claim 1, wherein the sample solution to the computational problem includes one or more intact chains that each comprise a set of chained qubits, and the defining, by the at least one digital processor, a post-processing Hamiltonian further comprises: determining the qubit bias of each of the chain component variables based at least partially on interaction strengths between each qubit of the respective set of connected qubits and each qubit of at least one of the sets of chained qubits.

4. The method of claim 3, wherein the defining the post-processing Hamiltonian such that the qubit bias of each of the chain component variables is at least partially based on interactions between each qubit of the respective set of connected qubits and each qubit of one or more of the sets of chained qubits further comprises: defining the post-processing Hamiltonian such that a spin bias of the qubit bias of each of the chain component variables is based on a spin value shared by all qubits of the set of chained qubits.

5. The method of claim 1, wherein the defining, by the at least one digital processor, a post-processing Hamiltonian further comprises: determining interaction strengths between chain component variables belonging to different ones of the one or more broken chains.

6. The method of claim 5, wherein the determining interaction strengths between chain component variables belonging to different ones of the one or more broken chains further comprises: determining a sum of interaction strengths of the embedded Hamiltonian between each qubit of a set of connected qubits of a first broken chain and each qubit of a set of connected qubits of a second broken chain of the one or more broken chains.

7. The method of claim 1, wherein the causing, by the at least one digital processor, the quantum processor to evolve based on the post-processing Hamiltonian to a state representative of the sample solution to the computational problem represented by the problem Hamiltonian in which the one or more broken chains are repaired comprises: causing the quantum processor to perform quantum annealing based on the post-processing Hamiltonian.

8. The method of claim 1, further comprising: reading out, by the at least one digital processor, the state of the quantum processor representative of the sample solution to the computational problem represented by the problem Hamiltonian in which the one or more broken chains are repaired.

9. The method of claim 1, wherein prior to the receiving, by the at least one digital processor, a sample solution to a computational problem represented by a problem Hamiltonian embedded onto the quantum processor, the method comprises:
- embedding, by the at least one digital processor, a representation of the computational problem onto the quantum processor according to the embedded Hamiltonian; and,
- causing, by the at least one digital processor, the quantum processor to evolve to reach the sample solution to the computational problem represented by the problem Hamiltonian,
- and wherein the receiving, by the at least one digital processor, a sample solution to a computational problem represented by a problem Hamiltonian embedded onto the quantum processor comprises:
- reading out, by the at least one digital processor, the sample solution to the computational problem represented by the problem Hamiltonian, and
- determining, by the at least one digital processor, that the sample solution to the computational problem represented by the problem Hamiltonian comprises the one or more broken chains.

10. A hybrid computing system comprising:
- at least one digital processor;
- a quantum processor comprising a plurality of qubits, the quantum processor communicatively coupled to the at least one digital processor; and,
- at least one non-transitory processor-readable medium communicatively coupleable to the at least one digital processor, the non-transitory processor-readable medium which stores at least one of processor-executable instructions or data which, when executed by the at least one digital processor, cause the at least one digital processor to:
- receive, by the at least one digital processor, a sample solution to a computational problem represented by a problem Hamiltonian embedded onto the quantum processor by an embedded Hamiltonian, wherein the sample solution to the computational problem comprises one or more broken chains,
- define, by the at least one digital processor, a post-processing Hamiltonian representing the computational problem, the post-processing Hamiltonian having chain component variables, each one of the chain component variables corresponding to a respective set of connected qubits of the plurality of qubits that belong to one of the one or more broken chains, and each qubit in a same set of connected qubits having a same spin direction, wherein a qubit bias of each of the chain component variables in the post-processing Hamiltonian is at least partially based on qubit biases of the embedded Hamiltonian of a respective set of connected qubits,
- embed, by the at least one digital processor, the post-processing Hamiltonian onto the quantum processor, and
- cause, by the at least one digital processor, the quantum processor to evolve based on the post-processing Hamiltonian to a state representative of the sample solution to the computational problem represented by the problem Hamiltonian in which the one or more broken chains are repaired.

11. The hybrid computing system of claim 10, wherein the quantum processor is a quantum annealer.

12. The hybrid computing system of claim 10, wherein the plurality of qubits comprise a plurality of superconducting qubits.

13. The hybrid computing system of claim 10, wherein the sample solution to the computational problem includes one or more intact chains, and the qubit bias of each of the chain component variables is based on:
- a sum of qubit biases of the embedded Hamiltonian along a respective set of connected qubits in one of the one or more broken chains; and,
- a spin bias contributed by one of the one or more intact chains.

14. The hybrid computing system of claim 10, the sample solution to the computational problem includes one or more intact chains that each comprise a set of chained qubits of the plurality of qubits, and the qubit bias of each of the chain component variables is based at least partially on interaction strengths between each qubit of the respective set of connected qubits and each qubit of at least one of the sets of chained qubits.

15. The hybrid computing system of claim 14, wherein a spin bias of the qubit bias of each of the chain component variables is based on a spin value shared by all qubits of the set of chained qubits.

16. The hybrid computing system of claim 10, wherein the post-processing Hamiltonian comprises interaction strengths between chain component variables belonging to different ones of the one or more broken chains.

17. The hybrid computing system of claim 15, wherein each interaction strength between chain component variables belonging to different ones of the one or more broken chains is based on a sum of interaction strengths of the embedded Hamiltonian between each qubit of a set of connected qubits of a first broken chain and each qubit of a set of connected qubits of a second broken chain of the one or more broken chains.

18. The hybrid computing system of claim 10, wherein the at least one digital processor reads out the state of the quantum processor representative of the sample solution to the computational problem represented by the problem Hamiltonian in which the one or more broken chains are repaired.

19. The hybrid computing system of claim 10, wherein before the at least one digital processor receives the sample solution to the computational problem represented by the problem Hamiltonian embedded onto the quantum processor, the at least one digital processor:
- embeds a representation of the computational problem onto the quantum processor according to the embedded Hamiltonian; and,
- causes the quantum processor to evolve based on the embedded Hamiltonian to reach the sample solution to the computational problem represented by the problem Hamiltonian,
- and wherein causing the at least one digital processor to receive, by the at least one digital processor, a sample solution to a computational problem represented by a problem Hamiltonian embedded onto the quantum processor includes causing the at least one digital processor to:
- read out the sample solution to the computational problem represented by the problem Hamiltonian, and
- determine that the sample solution to the computational problem represented by the problem Hamiltonian comprises the one or more broken chains.

* * * * *